United States Patent
Aucoin

(10) Patent No.: US 9,592,761 B2
(45) Date of Patent: *Mar. 14, 2017

(54) DEVICE AND METHOD FOR SECURING A MOBILITY DEVICE IN A VEHICLE

(71) Applicant: Richard A. Aucoin, Nashville, TN (US)

(72) Inventor: Richard A. Aucoin, Nashville, TN (US)

(73) Assignee: Radock Systems, I.P., LLC, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,255

(22) Filed: Jul. 14, 2015

(65) Prior Publication Data

US 2015/0314720 A1    Nov. 5, 2015

Related U.S. Application Data

(63) Continuation of application No. 13/976,754, filed as application No. PCT/US2011/060964 on Nov. 16, 2011, now Pat. No. 9,079,524.

(60) Provisional application No. 61/414,756, filed on Nov. 17, 2010, provisional application No. 61/438,870, filed on Feb. 2, 2011.

(51) Int. Cl.
| | | |
|---|---|---|
| *A61G 3/08* | (2006.01) | |
| *B60P 7/08* | (2006.01) | |
| *A61G 3/06* | (2006.01) | |
| *A61G 5/04* | (2013.01) | |

(52) U.S. Cl.
CPC .............. *B60P 7/08* (2013.01); *A61G 3/0808* (2013.01); *A61G 3/062* (2013.01); *A61G 5/045* (2013.01); *A61G 2203/14* (2013.01); *A61G 2203/80* (2013.01)

(58) Field of Classification Search
CPC ................................ A61G 3/08; A61G 3/0808
USPC ............................. 410/2, 3, 7; 414/539, 540
See application file for complete search history.

(56) References Cited

U.S. PATENT DOCUMENTS

| | | |
|---|---|---|
| 4,019,752 A | 4/1977 | Leon et al. |
| 4,060,271 A | 11/1977 | Williams |
| 4,062,209 A | 12/1977 | Downing et al. |
| 4,688,843 A | 8/1987 | Hall |
| 4,966,392 A | 10/1990 | Featon et al. |
| 5,026,244 A | 6/1991 | Dorn |
| 5,344,265 A | 9/1994 | Ullman et al. |
| 5,388,937 A | 2/1995 | Farsai |

(Continued)

OTHER PUBLICATIONS

International Search Report and Written Opinion dated Mar. 21, 2012, Application No. PCT/US2011,060964, 8 pages.

*Primary Examiner* — Hilary Gutman
(74) *Attorney, Agent, or Firm* — Gutwein Law

(57) ABSTRACT

A device for securing a mobility device in a mobility vehicle or on a lifting device that is installed in or on a mobility vehicle or trailer. The securing device comprises a docking assembly, a locking assembly and a guide assembly. The locking assembly includes a receiving member having an interior passageway and a locking pin. The guide assembly includes a support plate attachable to the mobility device and an alignment rod whereby the alignment rod extends out from one side of the mobility device and engages the receiving member. The alignment rod is sized and configured to extend into the interior passageway thereby allowing the locking pin to extend into the interior passageway to secure the alignment rod.

7 Claims, 20 Drawing Sheets

(56) References Cited

U.S. PATENT DOCUMENTS

| | | | |
|---|---|---|---|
| 5,391,030 | A | 2/1995 | Lee |
| 5,567,095 | A | 10/1996 | James et al. |
| 5,628,595 | A | 5/1997 | Harris |
| 6,234,732 | B1 | 5/2001 | Trippensee et al. |
| 6,287,060 | B1 | 9/2001 | Girardin |
| 6,352,396 | B1 | 3/2002 | Budd et al. |
| 6,471,454 | B1 | 10/2002 | Koller |
| 6,474,916 | B2 | 11/2002 | Constantin |
| 6,524,039 | B1 | 2/2003 | Magnuson et al. |
| 6,685,403 | B2 | 2/2004 | Constantin |
| 6,776,564 | B1 | 8/2004 | Kiernan et al. |
| 6,899,497 | B2 | 5/2005 | Cardona et al. |
| 7,229,238 | B2 | 6/2007 | Girardin et al. |
| 7,429,155 | B2 | 9/2008 | Sakano et al. |
| 7,431,546 | B2 | 10/2008 | Panzarella et al. |
| 7,455,490 | B1 | 11/2008 | Goosen |
| 7,708,507 | B2 | 5/2010 | Feng |
| 7,717,655 | B2 | 5/2010 | Cardona |
| 7,736,104 | B2 | 6/2010 | Hobson |
| 7,854,576 | B2 | 12/2010 | Girardin et al. |
| 7,963,730 | B2 | 6/2011 | Ditch et al. |
| 2003/0012617 | A1 | 1/2003 | Constantin |
| 2006/0193708 | A1 | 8/2006 | Ditch et al. |
| 2009/0214314 | A1 | 8/2009 | Girardin et al. |
| 2010/0086375 | A1 | 4/2010 | Tremblay et al. |

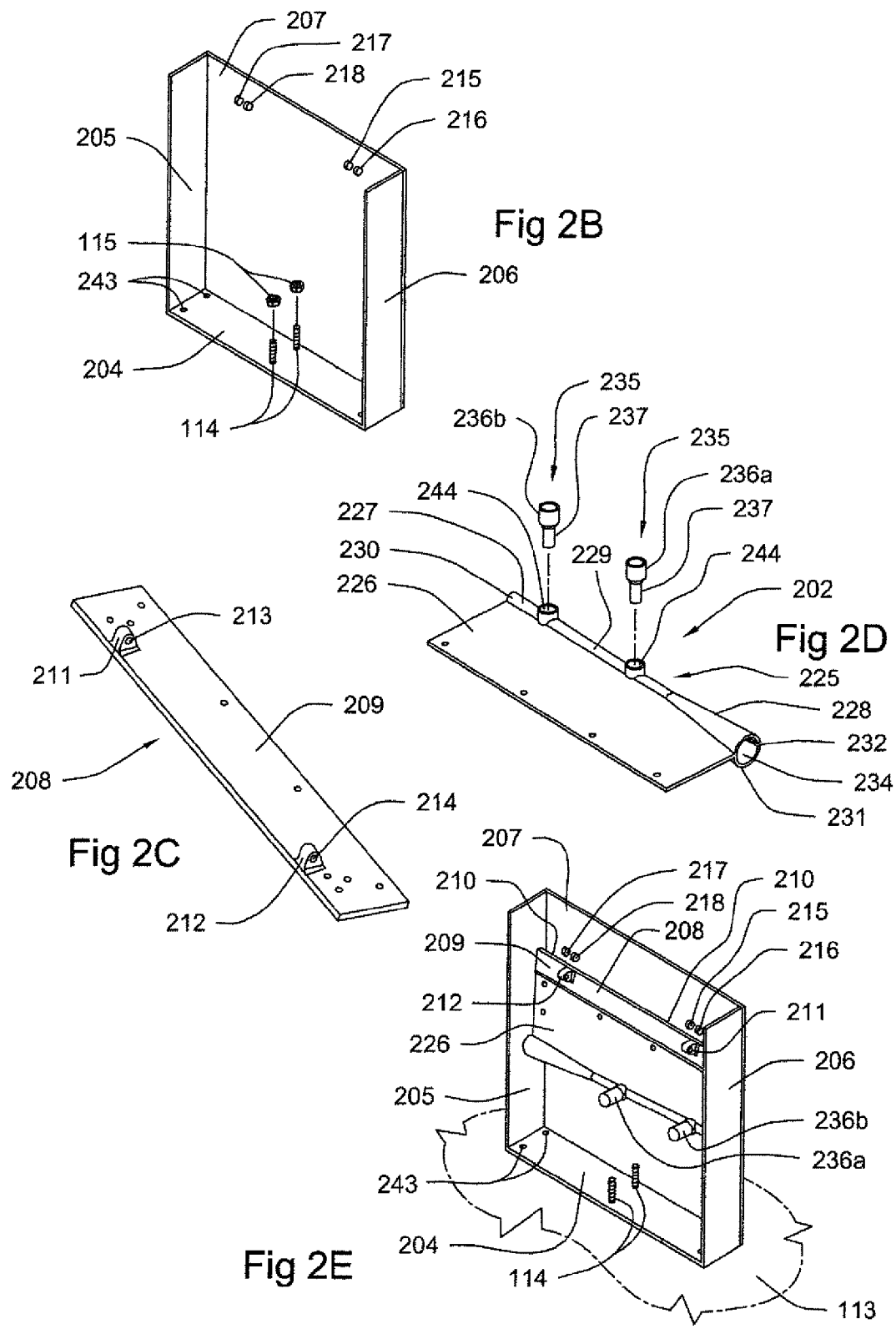

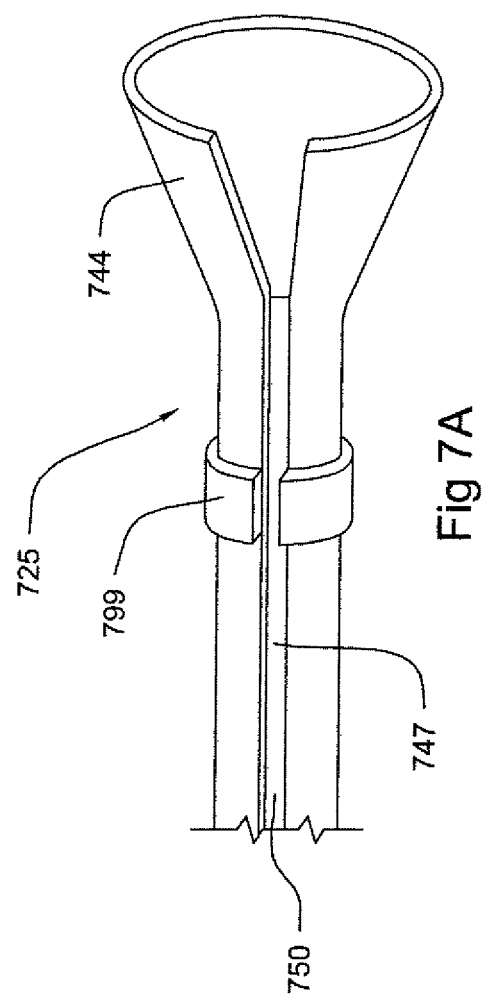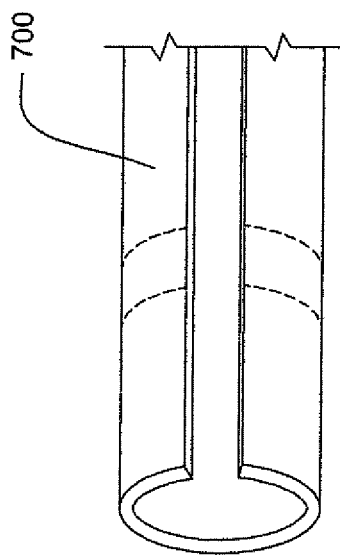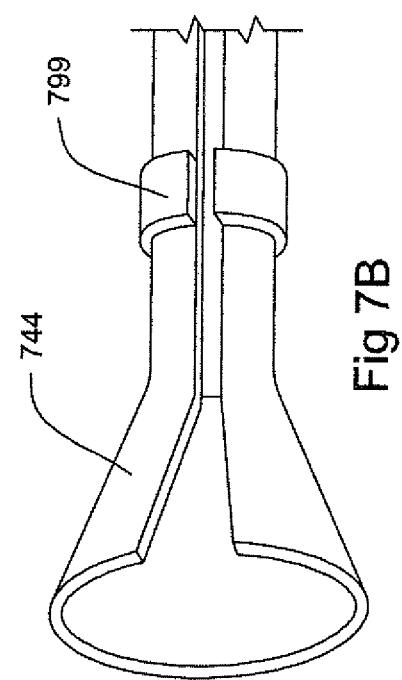

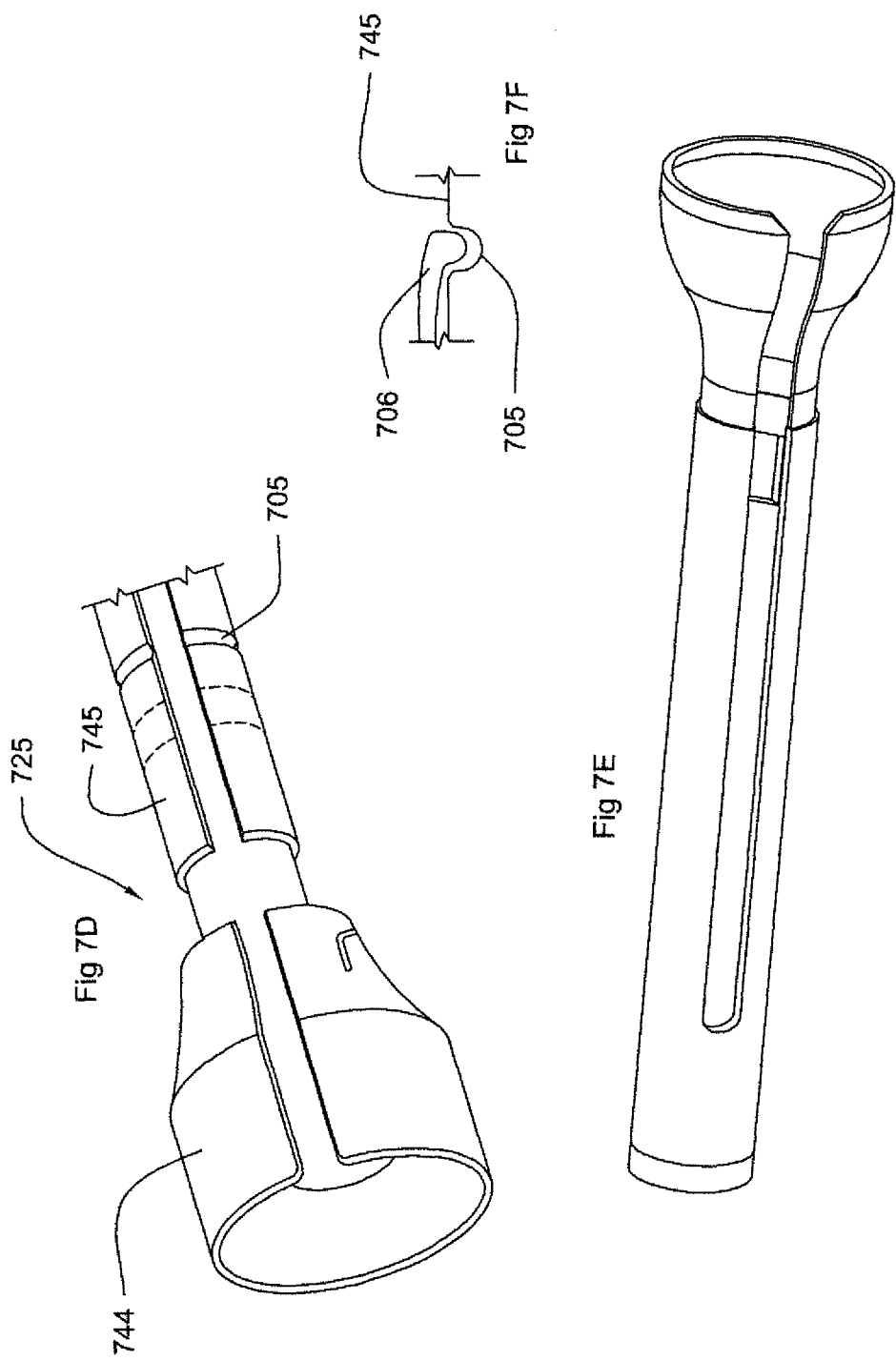

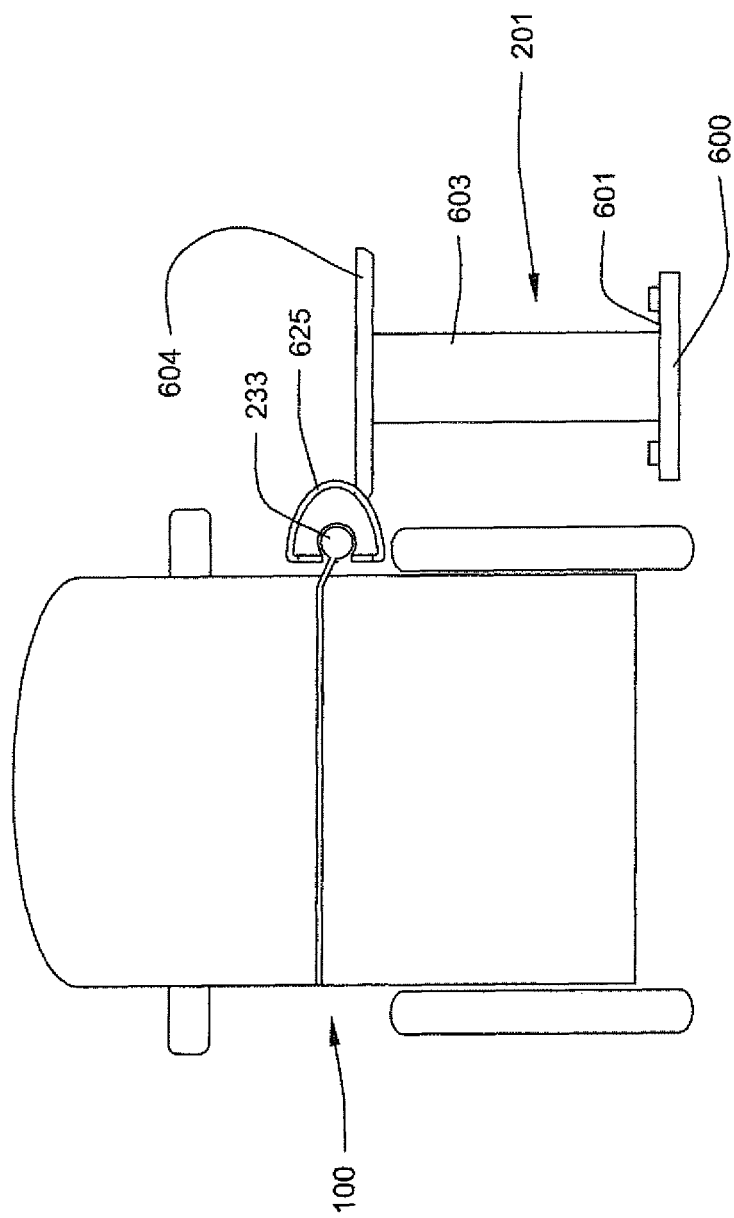

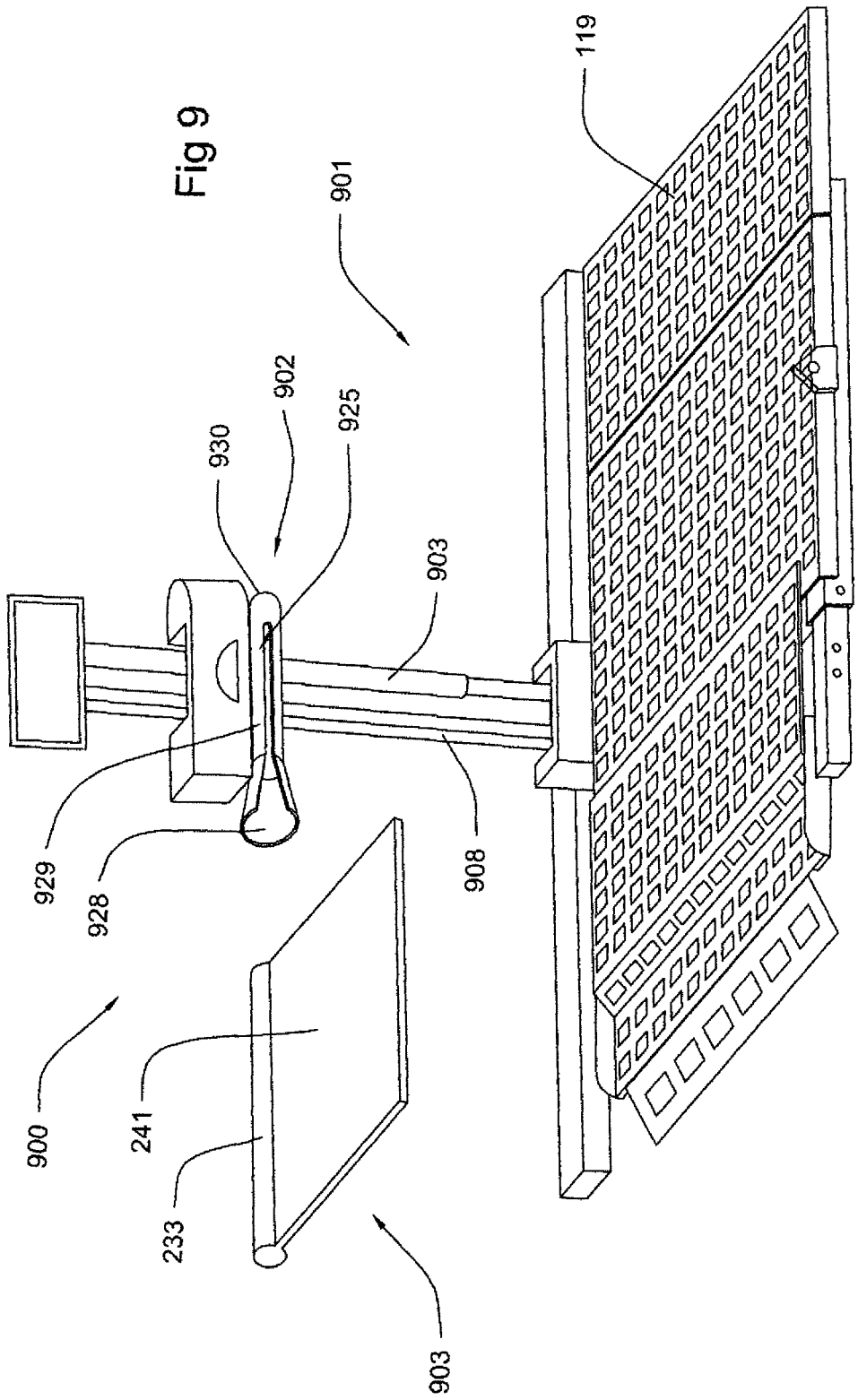

DEVICE AND METHOD FOR SECURING A MOBILITY DEVICE IN A VEHICLE

CROSS REFERENCE TO RELATED APPLICATIONS

This application is a continuation of U.S. application Ser. No. 13/976,754, which is the National Stage of International Application No. PCT/US11/60964, filed Nov. 16, 2011, which claims the benefit under 35 U.S.C. §119(e) of U.S. Provisional Patent Application No. 61/414,756 filed on Nov. 17, 2010, and of U.S. Provisional Patent Application No. 61/438,870, filed on Feb. 2, 2011, all of which applications are hereby incorporated by reference in their entireties.

FIELD OF THE INVENTION

This invention relates in general to devices for securing a mobility device, such as a wheelchair or scooter, to a mobility vehicle, and more particularly to a securing device that automatically locks a mobility device in a desired position in a mobility vehicle or on a lifting device that is installed in or on a mobility vehicle or trailer.

BACKGROUND OF THE INVENTION

It has remained a long standing problem in the mobility vehicle industry to provide an economical means for securing a mobility device, such as a wheelchair or scooter, in a fail safe manner, and fixing the mobility device in a desired position that is easily engaged or disengaged by the mobility device occupant without additional assistance.

Over the past decades, multiple solutions for securing a mobility device have been proposed. These include various tie-down devices, locking mechanisms affixed to the vehicle floor and provided with pivoting arms to hold the mobility device in place, clamp posts with jaw members to engage the mobility device, one or more post members extending vertically from the vehicle floor with mobility device mounted locking devices engaging the vertical posts, side press assemblies, as well as many other mobility device engaging and locking devices. Despite the time, effort and monies expended, there remains a need to provide an economical means for securing a mobility device in a fail safe manner, and fixing the mobility device in a desired position that is easily engaged or disengaged by the mobility device occupant without additional assistance.

SUMMARY OF THE INVENTION

An object of this invention is to provide a device for securing in a fail safe manner a mobility device, such as a wheelchair or scooter, in a mobility vehicle in a desired position. Another object of this invention is to provide a securing device that reliably inhibits twisting or rotation of the mobility device once it is locked into position. Another object of this invention is to provide a securing device that permits the mobility device to be easily maneuvered by the mobility device occupant into locking engagement with the securing device. Still another object of this invention is to provide a securing device that is generally universal and can be utilized with most mobility devices currently in the marketplace. A still further object of this invention is to provide a securing device that not only secures a mobility device in a desired position, but further provides additional functions of storage, cup holder, storage shelf, storage bins, HVAC air duct with heating assembly, power adaptor connections, trash depositing, or control module for operation of the securing device locking assembly. Still a further object of this invention is to provide a device for securing a mobility device on a lifting device that is installed in or on a mobility vehicle or trailer. Additional objects and advantages of this invention shall become apparent from the ensuing descriptions of the invention.

Accordingly, a securing device is disclosed having a docking assembly, a locking assembly and a guide assembly for positioning and securing a mobility device in a desired position in a mobility vehicle or on a lifting device that is installed in or on a mobility vehicle or trailer. The docking assembly includes a base plate that can be fixed to the vehicle floor or lifting device, at least one support member affixed to and extending vertically upward from the base plate, and a positioning member attachable to the support member whereby the positioning member is positioned parallel to and at a pre-determined height from the vehicle floor or lifting device. The locking assembly includes a receiving member having an interior passageway and affixed to the positioning member at its outer end section. The receiving member has a locking end opening. The guide assembly includes a support plate attachable to the mobility device and an arm member affixed to the support plate whereby the arm member extends out from one side of the mobility device and engages the receiving member.

In one embodiment the receiving end section of the receiving member is formed of one or more tapered side walls forming an enlarged receiving opening and a smaller inner passageway opening, preferably in the shape of a truncated cone or pyramid. In an alternate preferred embodiment the receiving end section truncated cone has a "D" shaped cross-section with the straight side of the "D" extending further from the outer end section of the positioning member. In still a further embodiment the receiving end section is a concentric or eccentric reducer. There may be a sensor, such as a micro switch, that detects and transmits a signal upon sensing the presence of an object entering the passageway. In addition, a locking pin assembly including a locking pin may be operatively connected to a sensor to receive a signal upon sensing the presence of an object entering the passageway. The guide assembly includes a support plate attachable to the mobility device. It further includes an alignment rod affixed to the support plate and positioned parallel to and outside the one side of the mobility device at a height from the vehicle floor to align with the receiving member passageway.

Another aspect of this invention is a device for securing a mobility device in a desired position on a lifting device that is installed in or on a mobility vehicle or trailer. The device for securing a mobility device comprises a docking assembly, a locking assembly, and a guide assembly. The docking assembly comprises a base plate, and at least one vertical support structure extending upward from the base plate. The locking assembly comprises a receiving member having an interior passageway and affixed to the docking assembly, and a locking pin assembly to drive a locking pin through an opening in the receiving member and into the interior passageway. The guide assembly is configured to align the mobility device into position for locking engagement with the receiving member. The guide assembly comprises a support plate attachable to the mobility device, and an alignment rod affixed to the support plate and having an opening extending through the rod, the alignment rod positioned parallel to and outside the one side of the mobility device at a height from the vehicle floor to align with the receiving member passageway, the alignment rod being sized to extend into the passageway.

The foregoing has outlined rather broadly the features and technical advantages of the present invention in order that the detailed description of the invention that follows may be understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate preferred embodiments of this invention. However, it is to be understood that these embodiments are not intended to be exhaustive, nor limiting of the invention. These embodiments are but examples of some of the forms in which the invention may be practiced.

FIG. 2B is a three-quarter front perspective view of a preferred embodiment of the cabinet of the docking assembly.

FIG. 2C is a three-quarter rear perspective view of a preferred embodiment of the hinge plate of the docking assembly to permit the positioning member to pivot into the docking assembly structure.

FIG. 2D is a three-quarter front perspective view of a preferred embodiment of the positioning member of this invention illustrated in FIG. 2A.

FIG. 2E is a three-quarter front perspective view of the positioning member illustrated in FIG. 2A pivoted into the docking assembly structure when not in use as shown in FIG. 2C.

FIGS. 7A-7F illustrate an alternate preferred embodiment of the receiving end section of the docking assembly receiving member.

FIGS. 8A-8B illustrate a wheel chair docked to the docking assembly.

FIG. 9 illustrates an alternative embodiment of a device for securing a mobility device in accordance with this invention wherein the docking assembly is affixed to a lifting device for a mobility vehicle.

DESCRIPTION OF THE INVENTION

Without any intent to limit the scope of this invention, reference is made to the Figures in describing the preferred embodiments of the invention. Although the accompanying description below is discussed in relation to a powered wheelchair, a device for securing a mobility device in accordance with this invention is not limited only to powered wheelchairs. A device for securing a mobility device in accordance with this invention may also be used with other mobility devices, such as scooters, manually propelled wheelchairs, and so forth.

Figure 1B:
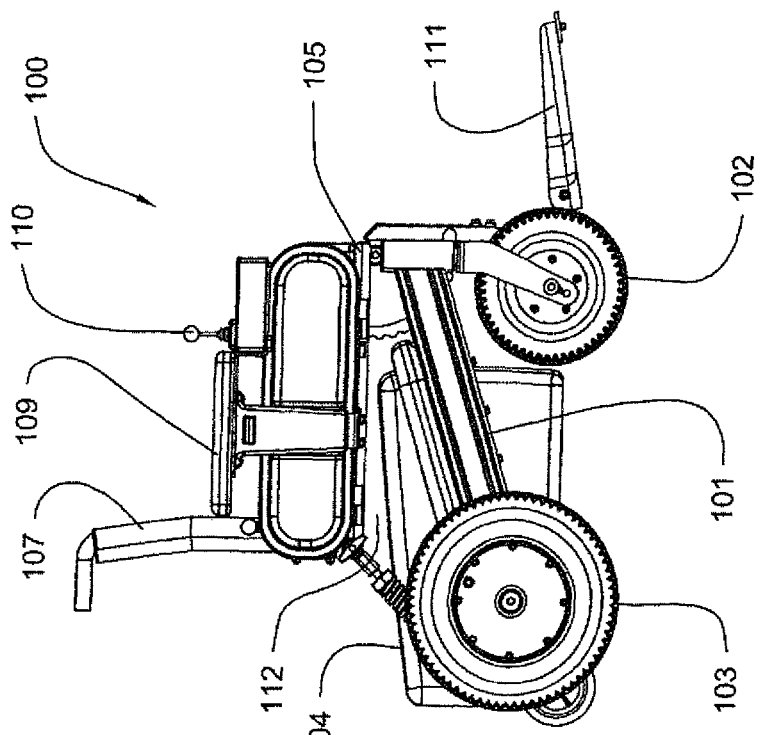
FIG. 1B is a side view of the powered wheelchair of FIG. 1A.
Figure 1A:
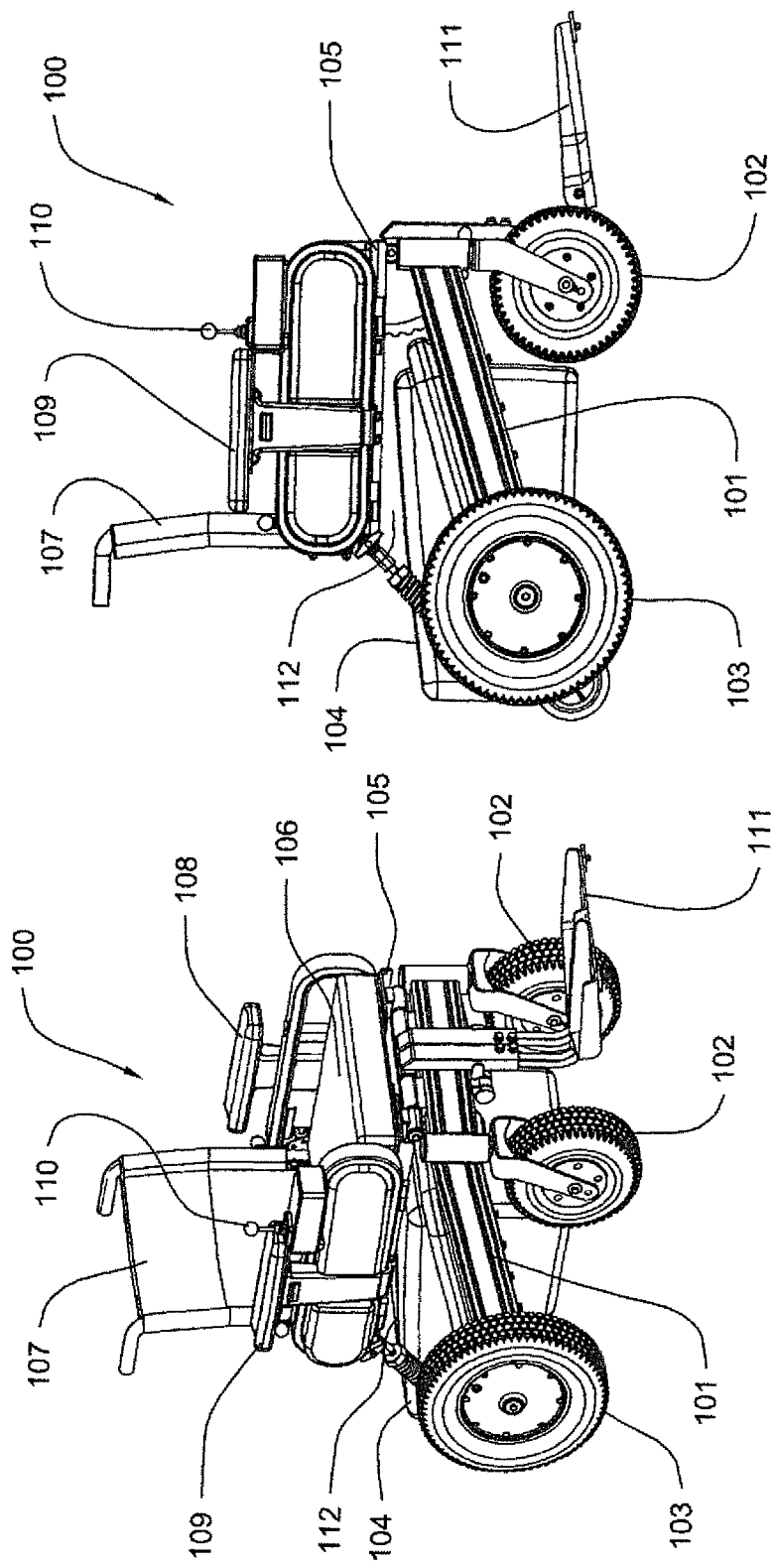
FIG. 1A illustrates a typical powered wheelchair that is to be secured inside a mobility vehicle, such as a van.

FIGS. 1A and 1B depict a conventional powered wheelchair shown generally at 100. Such wheelchairs generally include a base frame 101 to which are operatively attached sets of front and rear wheels 102 and 103, respectively. Also attached to the base frame 101 is a power source contained in housing 104. In addition, there will be a seat frame 105 also affixed to the base frame 101 on which a seat 106 having a back rest 107 is mounted. Typically, a pair of arm rests 108 and 109 are attached to the seat frame 105, wherein steering control mechanism 110 is mounted on one of the arm rests 108, 109 where it can be manipulated by a person sitting in the seat 106 and can be operatively connected to the power source (such as batteries) in housing 104. If desired, removable foot rests 111 can also be affixed to the base frame 101. The actual construction of the powered wheelchair 100 can vary, but almost universally there will be a gap 112 between the base frame 101 and the seat frame 105 of sufficient size to bolt or otherwise affix a support plate to one or the other or both of the frames 101, 105.

Figure 1C:
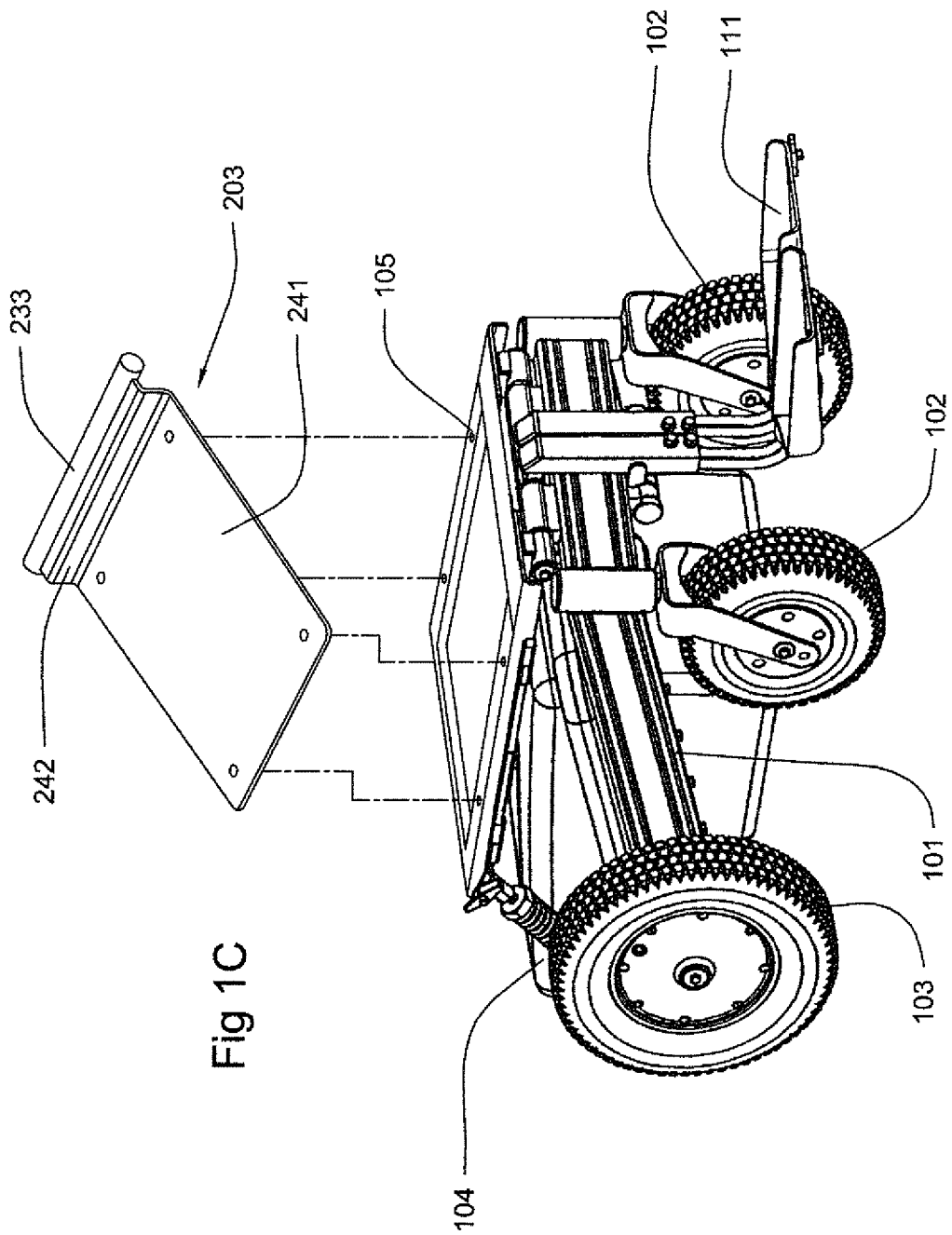
FIG. 1C is a three-quarter perspective view of a preferred embodiment of the guide assembly affixable to the base of a powered wheelchair of FIG. 1A.

Referring now to FIGS. 2A-2E, a device for securing a mobility device 200 of this invention includes three basic assemblies: a docking assembly 201 affixable to the floor panel 113 of a mobility vehicle (not shown), a locking assembly 202 attached to the docking assembly 201, and a guide assembly 203 attached to the base frame 101 or the seat frame 105 of powered wheelchair 100 as shown in FIG. 1C.

The docking assembly 201 may include a cabinet-type structure formed from a base plate 204 that is bolted or otherwise attached to the vehicle floor panel 113 at a position substantially parallel to the desired location to affix the wheelchair 100, one pair of opposing, separated side walls 205, 206 vertically extending from the base plate 204, one or more back support members 207 affixed perpendicularly between and to the side walls 205, 206 to rigidify the cabinet-type structure, and a positioning member 208 attachable to at least one of the back support members 207 at a position parallel to and at a pre-determined height from the vehicle floor panel 113 and sized to extend beyond the side walls 205, 206. In a preferred embodiment illustrated in FIG. 2A, positioning member 208 will be attached to the back support members 207 whereby it can be locked into the desired parallel position when the docking assembly 201 is in use or whereby it can be pivoted to fit between side walls 205, 206 when not in use. In this embodiment, positioning member 208 is provided with a pivot plate 209 that is attached to back support member 207 by hinges 210. Pivot plate 209 is provided with two aligned shoulder members 211, 212, each having openings 213, 214, respectively, extending through their respective shoulder member 211, 212. Shoulder members 211, 212 are positioned on pivot plate 209 to fit between corresponding pairs of shoulder members 215, 216 and 217, 218 also each having an opening, respectively, whereby securing means 223, 224, respectively, can be inserted through the corresponding openings 213 and 214, respectively, to fix pivot plate 209 in a position perpendicular to docking assembly back support member 207. Positioning member 208 is bolted or otherwise affixed to pivot plate 209 whereby receiving member 225 will be fixed at the desired position when in use, but which will be positioned within docking assembly 201 when not in use. This preferred embodiment minimizes the vertical profile of the docking assembly 201 to reduce possible snagging of other things on the docking assembly 201, as well as to allow additional storage capacity in the mobility vehicle when the docking assembly 201 is not in use. To maximize the stability of docking assembly 201, it is preferred that back support member 207 is a plate that runs the full length of side walls 205, 206.

Figure 2A:
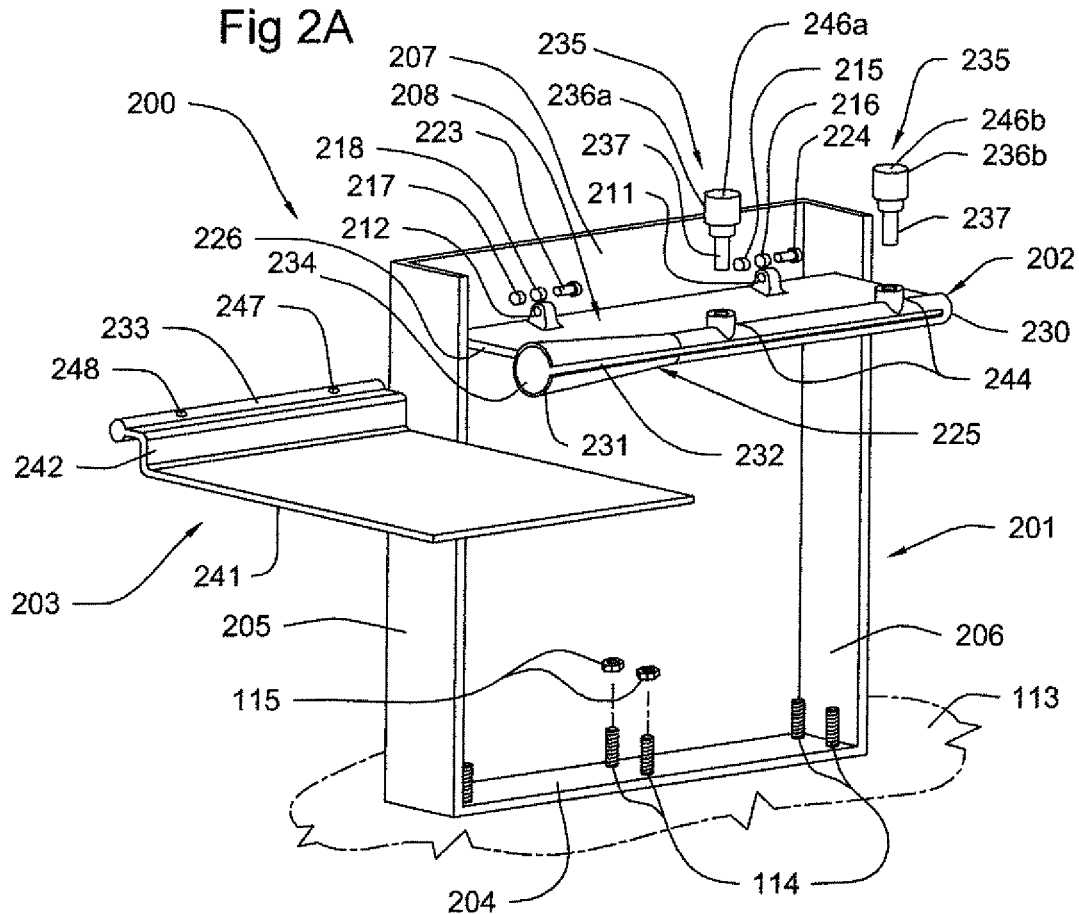
FIG. 2A is a three-quarter front perspective view of a preferred embodiment of the guide assembly affixable to the base of the powered wheelchair of FIG. 1A, the docking assembly affixable to the mobility vehicle floor panel and the locking assembly affixed to the docking assembly for receiving the guide assembly and locking the powered wheelchair in the desired position.
Figure 3:
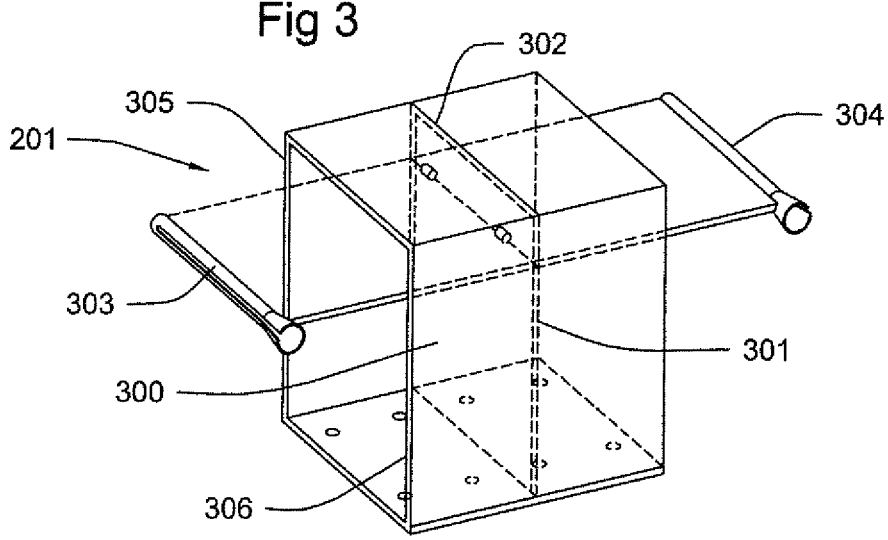
FIG. 3 is a three-quarter perspective view of an alternate preferred embodiment of the docking assembly structured to permit the docking of two mobility devices.

In an alternate preferred embodiment shown in FIG. 3, docking assembly 201 is structured to secure two wheelchairs. In this embodiment, secured to opposite sides 300 and 301 of back support member 302 are positioning members 303 and 304, respectively. Each positioning member 303 and 304 is sized to extend beyond the side walls 305, 306, respectively. It is also preferred that both positioning members 303 and 304 are attached to the back support member 302 in similar fashion as illustrated in FIGS. 2A-2E whereby each positioning members 303 and 304 can be locked into the desired parallel position when the docking assembly 201 is in use or whereby each positioning members 303 and 304 can be pivoted to fit between side walls 305 and 306 when not in use.

The locking assembly 202 as illustrated in FIGS. 2C-2E includes an extension plate 226 that is bolted or otherwise conventionally affixed to pivot plate 209. It further includes a receiving member 225, preferably a tubular member, affixed to and running parallel to the outer edge 227 of extension plate 226. The length of extension plate 226 is set to position receiving member 225 at the desired distance from docking assembly 201 to permit powered wheelchair 100 unencumbered passage to permit the guide assembly 203 to engage the locking assembly receiving member 225. Receiving member 225 has a receiving end section 228, a main body section 229, and a stop end section 230. Each of the sections 228, 229, 230 may be structured having a circular, square, rectangular, oval or other shaped cross section. It is preferred that the same cross section shape be used for each section. However, regardless of the shape used, the receiving end section 228 will be greater at its outer edge 231 and tapered to the size and shape of the main body section 229. If the receiving end section 228 has a circular cross section, then its overall shape would resemble a truncated cone. On the other hand, if the receiving end section 228 has a square cross section, then its overall shape would resemble a truncated pyramid. Receiving member 225 also has a slot 232 that runs horizontally through each of sections 228, 229, 230 that is sized to permit the alignment rod 233 of guide assembly 203 to enter into receiving member passageway 234.

In addition to the receiving member 225, locking assembly 202 also includes one or more sensors that provide signals to a locking pin assembly 235. The locking pin assembly 235 includes conventional switch means 236a, 236b that react to the signals to extend or retract a locking pin 237 from its initial position. As explained below, the sensors are positioned to detect the presence of powered wheelchair 100 and when the powered wheelchair 100 is in the desired position to send a signal to activate the locking pin assembly 235 to extend locking pin 237 into passageway 244 to secure the wheelchair 100 in that position.

The guide assembly 203 includes a support plate 241 that is affixed to wheelchair base frame 101 or seat frame 105. The guide assembly 203 may further include a positioning arm member 242 affixed to wheelchair base frame 101 or seat frame 105 and alignment rod 233 affixed to positioning arm member 242. The position at which support plate 241 is affixed depends on the construction of wheelchair 100. However, in most wheelchair constructions there is a gap 112 between the wheelchair base frame 101 and the seat frame 105 to position and affix support plate 241 horizontally to either frame 101 or frame 105. It is preferred to affix support plate 241 to wheelchair 100 at that position which is more stable and will reliably maintain support plate 241 at a known height above the vehicle floor panel 113. It is further preferred that support plate 241 not extend beyond the wider spaced of wheelchair wheels 102 or 103 in order to maintain the normal width of wheelchair 100. Positioning arm member 242 is shaped to serve as a platform that permits alignment rod 233 to be fixed at a pre-determined height above the vehicle floor panel 113. In an alternate embodiment (see FIG. 6H), the guide assembly 203 may comprise the support plate 241 which is affixed to the alignment rod 203.

In operation, the docking assembly 201 is first affixed to the vehicle floor panel 113. In one preferred embodiment, threaded studs 114 are welded or otherwise conventionally affixed to the floor panel 113 at the desired locations. Docking assembly base plate 204 is provided with a series of openings 243 through which studs 114 can be extended to permit nuts 115 to affix base plate 204 to the vehicle floor panel 113. Alternatively, if one desires the docking assembly 201 be permanently affixed to the vehicle floor panel 113, then base plate 204 can be directly welded to the vehicle floor panel 113. Positioning member 208 is locked in a horizontal position to position receiving member 225 parallel to and distanced from the vehicle floor panel 113 at the desired height. For each locking pin assembly 235, receiving member 225 is provided with an opening 244 to permit locking pin 237 to move into and out of tubular receiving member passageway 234. Locking pin assembly 235 is affixed in position, preferably vertically, on receiving member 225. A preferred combination of sensor and locking pin assembly 235 would include a micro switch 236 positioned to detect the fully engaged position of the alignment rod 233 in the tubular receiving member passageway 234 and solenoid 246 controlling the movement of a locking pin 237. Examples of solenoids that could be used include a Deltrol Controls Med 12×1.500 solenoid or a Ledex Tubular Linear STA Series Pull 1"diameter×1.125"solenoid. In this embodiment, the locking pin 237 is retracted into the solenoid 246 and is not moved into passageway 234 until the micro switch 236 has detected the alignment rod 233 and signaled the solenoid 246 to move the locking pin 237 into passageway 234. Alignment rod 233 is provided with an opening 247 positioned to receive locking pin 237 when it is in the fully engaged position within passageway 234. If multiple solenoids are utilized, such as illustrated in FIGS. 2A and 2D, then alignment rod 233 is provided with one opening 247, 248 for each locking pin 237. The alignment rod openings 247, 248 are positioned whereby they will be engaged by one of the locking pins 237 when the alignment rod 233 is properly positioned in passageway 234. It is preferred that tubular receiving member stop end section 230 be constructed to block passageway 234 to prevent alignment rod 233 from traveling past the fully engaged position. In a preferred embodiment, the stop end section 230 has a stop shoulder sufficiently extending into passageway 234 to prohibit alignment rod 233 from continuing movement past stop shoulder. In a preferred embodiment, the stop end section 230 can be constructed as a cap having internal threads (not shown) sized to screw onto a threaded end section (not shown) of main body section 229 so as to completely block one end of passageway 234. Alternatively, the stop end section 230 may be welded onto the end of the main body section 229.

Powered wheelchair 100 is driven up a ramp into the interior of mobility vehicle (such as a van or similar vehicle) and steered to position alignment rod 233 to enter tubular receiving member receiving end 228. Receiving end 228 has a large opening to facilitate easier maneuvering of wheelchair 100 into position. In a preferred embodiment the cross-sectional shape of alignment rod 233 will match, but be slightly smaller than the cross-sectional shape of passageway 234 in tubular receiving member main body section 229 to permit a small tolerance between the alignment rod 233 and the interior surfaces forming the main body section 229. Wheelchair 100 will be driven forward until alignment rod 233 contacts stop end section shoulder located substantially near or at the end of the main body section 230. This contact will engage a micro switch 236a, 236b that signals solenoid 246a, 246b to magnetically disengage locking pin 237 to permit the solenoid spring to drive locking pin 237 into alignment rod opening 247, thus completing the docking procedure. To disengage the locking pin 237 from the alignment rod opening 247 to permit wheelchair 100 to be moved, switch 236a, 236b is operatively connected to solenoid 246a, 246b and is activated to signal solenoid 246 to magnetically engage locking pin 237 which will lift locking pin 237 from alignment rod opening 247 to permit the wheelchair 100 to be backed out of its docking position. In a preferred embodiment, switch 236a, 236b will be affixed to docking assembly side wall 206 to permit easy access, but which is not in the path of normal movement by a person sitting in wheelchair seat 106. If docking assembly 201 is designed to dock two wheelchairs, it is preferred that the first wheelchair is locked into place as described above, and then this process is repeated for the second wheelchair.

Because of the considerable weight of conventional powered wheelchairs and the speed at which they can be maneuvered, it is important that the construction of docking assembly 201, the locking assembly 202 and guide assembly 203, each be constructed of materials that can withstand the forces to which they will be subjected during the docking of wheelchair 100. In addition these elements of the invention must be constructed of materials that can maintain wheelchair 100 in fixed position should it be inadvertently engaged after it has been docked or should the mobility vehicle be involved in a collision.

Figure 4A:
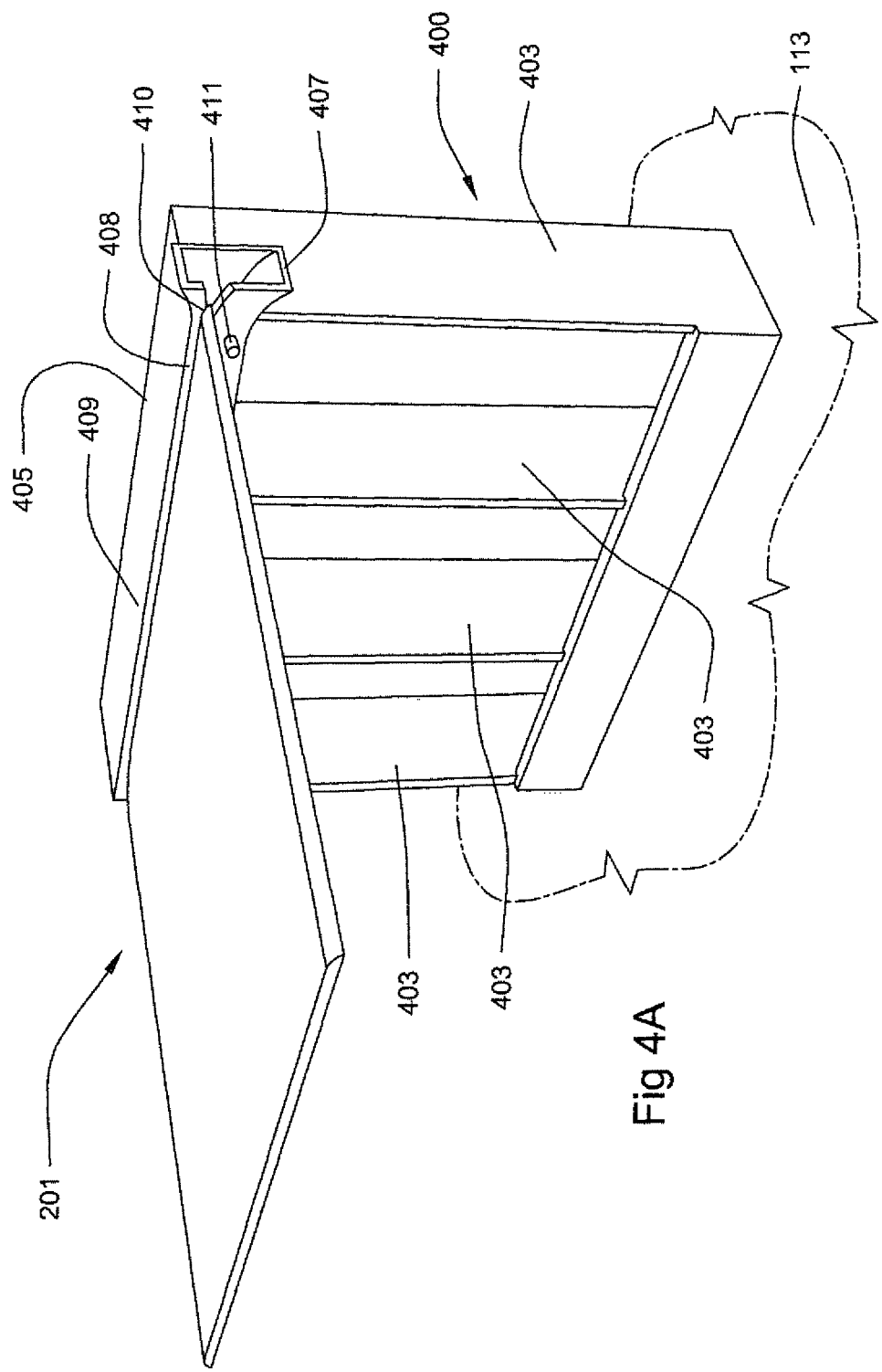
FIGS. 4A and 4B depict a three-quarter front perspective view and bottom perspective view, respectively, of an alternate preferred embodiment of the alignment plate with its alignment rod positioned in the docking assembly of this invention.
Figure 4B:
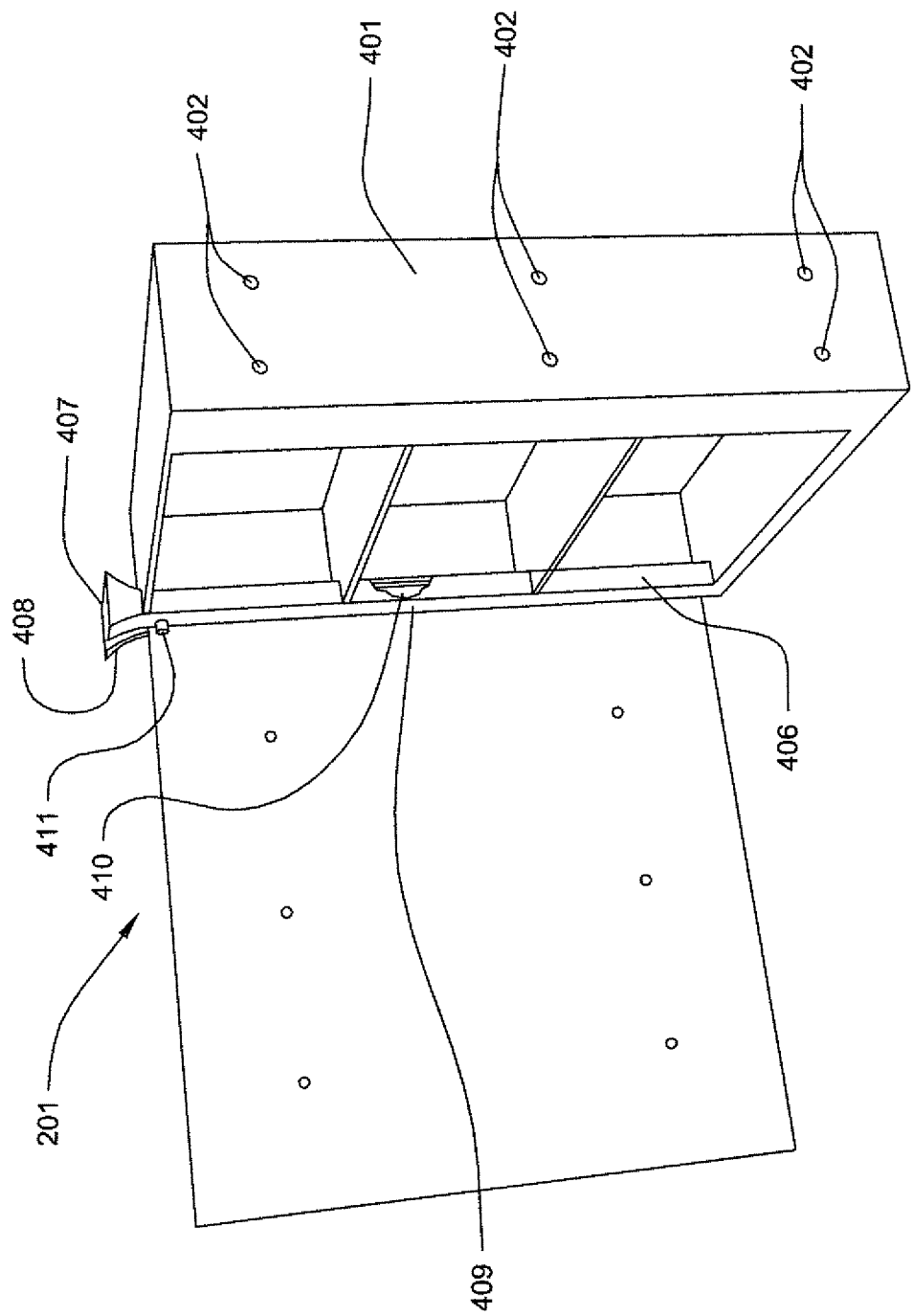
Figures 5A, 5B, 5C, 5D, 5E:
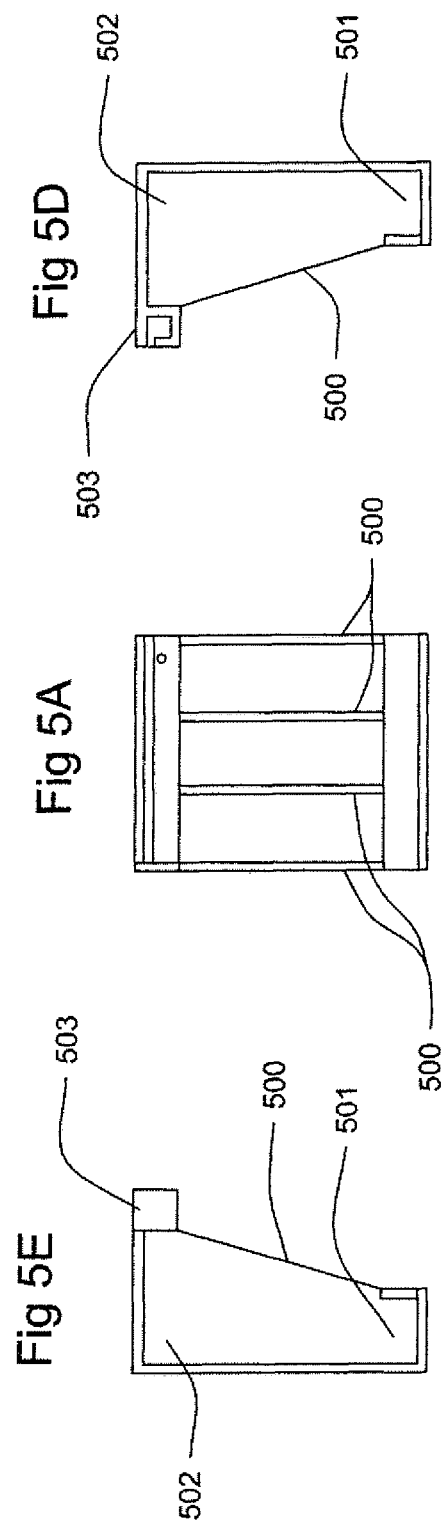
FIGS. 5A-5E are the front view, top view, bottom view, alignment rod insertion side view and opposing side view, respectively of an alternate embodiment of the docking assembly.

FIGS. 4A and 4B illustrate another preferred embodiment of a docking assembly 201 in accordance with this invention. These Figures illustrate a docking assembly cabinet 400 comprising a base plate 401 provided with openings 402 to permit the cabinet 400 to be bolted to the mobility vehicle flooring 113. The cabinet 400 includes a series of vertical support plates 403 affixed at their lower ends to the base plate 401 or toe plate 404 and at their upper ends to top plate 405. The docking assembly 201 further comprises a tubular positioning member 406 affixed to the vertical support plates 403. Tubular positioning member 406 has an enlarged receiving end section 407 and a slot 408 running along its exterior facing side 409 to receive the guide assembly alignment rod 410. Sensor assembly 411 is illustrated positioned on side 409 below slot 408 to provide an unobstructed top to cabinet 400. In addition this embodiment provides a more contemporary, cleaner look that is easy to manufacture and provides the structural stability necessary to withstand the impact of the powered wheelchair 100 during the docking procedure while maintaining wheelchair 100 in locked position during vehicle operation.

FIGS. 5A-5E illustrate a still further preferred embodiment of the docking assembly 201. This embodiment is similar to that illustrated in FIGS. 4A and 4B. However, the vertical panels 500 are narrower at their lower end section 501 and wider at their upper end section 502 to provide additional clearance for powered wheelchair 100 to dock. Also, this embodiment does not employ a sloped wall receiver end section of the tubular receiving member 503 illustrated in the other embodiments. If desired, such a wall receiver end section could be incorporated on the receiving end of tubular receiving member 503.

Figure 6A:
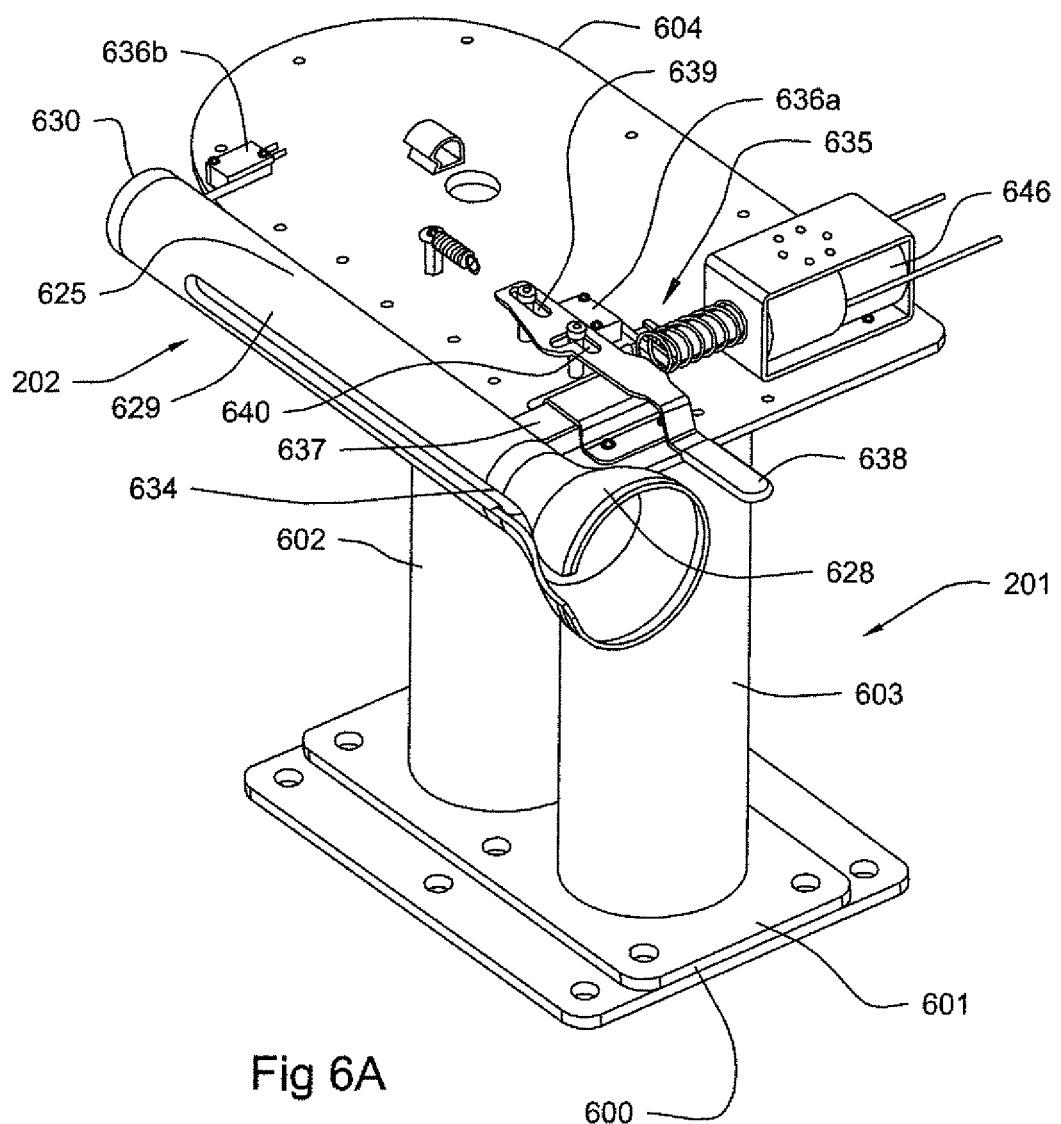
FIG. 6A illustrates an alternate preferred embodiment of the vertical support structure utilizing tubular support columns and a top plate.
Figure 6B:
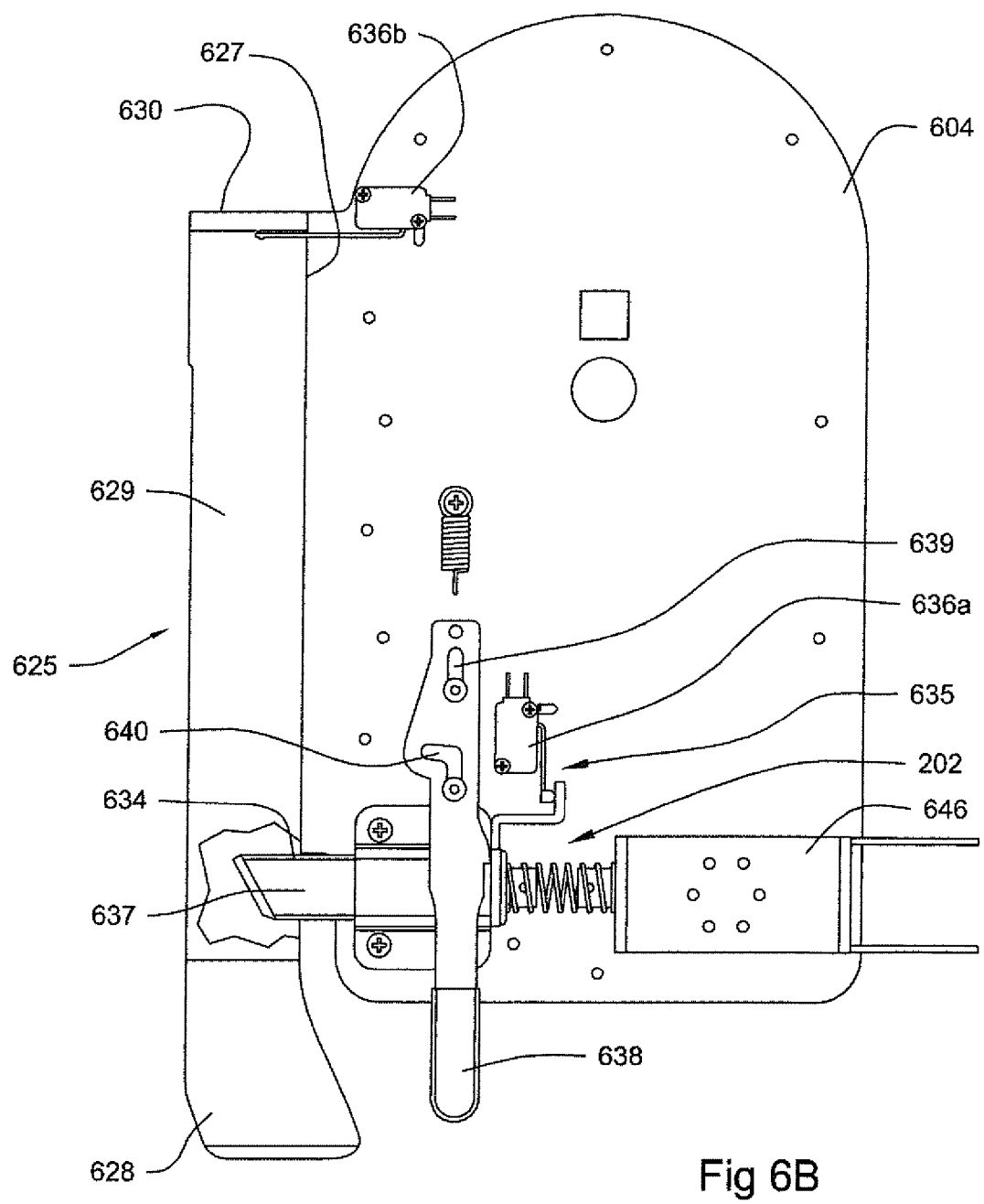
FIG. 6B illustrates is a top-view of the top plate of the embodiment of the docking assembly shown in FIG. 6A.

FIG. 6A and 6B illustrate another preferred alternate preferred construction of docking assembly 201. In this embodiment, the cabinet type structure is replaced with a vertical support structure. In this structure, a base plate 600 can be affixed to the vehicle flooring in the same manner as described above for base plate 204. In one preferred embodiment, a vertical support structure comprising two tubular support structures 602, 603 extends perpendicularly from the top surface 601 of base plate 600. In an alternate embodiment, one or more tubular support structures could be used. A top plate 604 is affixed to the tubular support structures 602, 603. Affixed at one end section 627 of the top plate 604 is receiving member 625, preferably a tubular receiving member. Receiving member 625 has a receiving end section 628, a main body section 629 and a stop end section 630 similar to that of receiving member 225 described above. In a preferred embodiment, the receiving end section may be a concentric reducer with a truncated cone shape (See FIG. 6A). In another preferred embodiment, the receiving end section may be an eccentric reducer (See FIG. 6B). In an alternate embodiment, the receiving end section 628 is constructed to have a truncated cone shape wherein the cone has been shaped to have a "D" shape cross-section. The receiving member 625 is also provided with at least one opening sized to allow the locking pin 637 to extend into the receiving member passageway 634. In a preferred embodiment, the top plate 604 may have an adjusting means so that the top plate is vertically adjustable, which allows for looser tolerances between the receiving member and the alignment rod. The adjusting means can be any conventional means such as a hinge and so forth. For example, if the tires on the wheelchair 100 are flat, the top plate 604 may be adjusted vertically so that the alignment rod can be inserted into the passageway of the receiving member. In a preferred embodiment (not shown), the top plate 604 can be constructed of two separated plates. A first separated plate is attached to at least one of vertical support structure and a second separated plate is adjustably attached to the first separated plate to permit a variance in the position of the receiving member from the docking assembly. The adjusting means can be any conventional means such as a hinge and so forth.

Figure 6C:
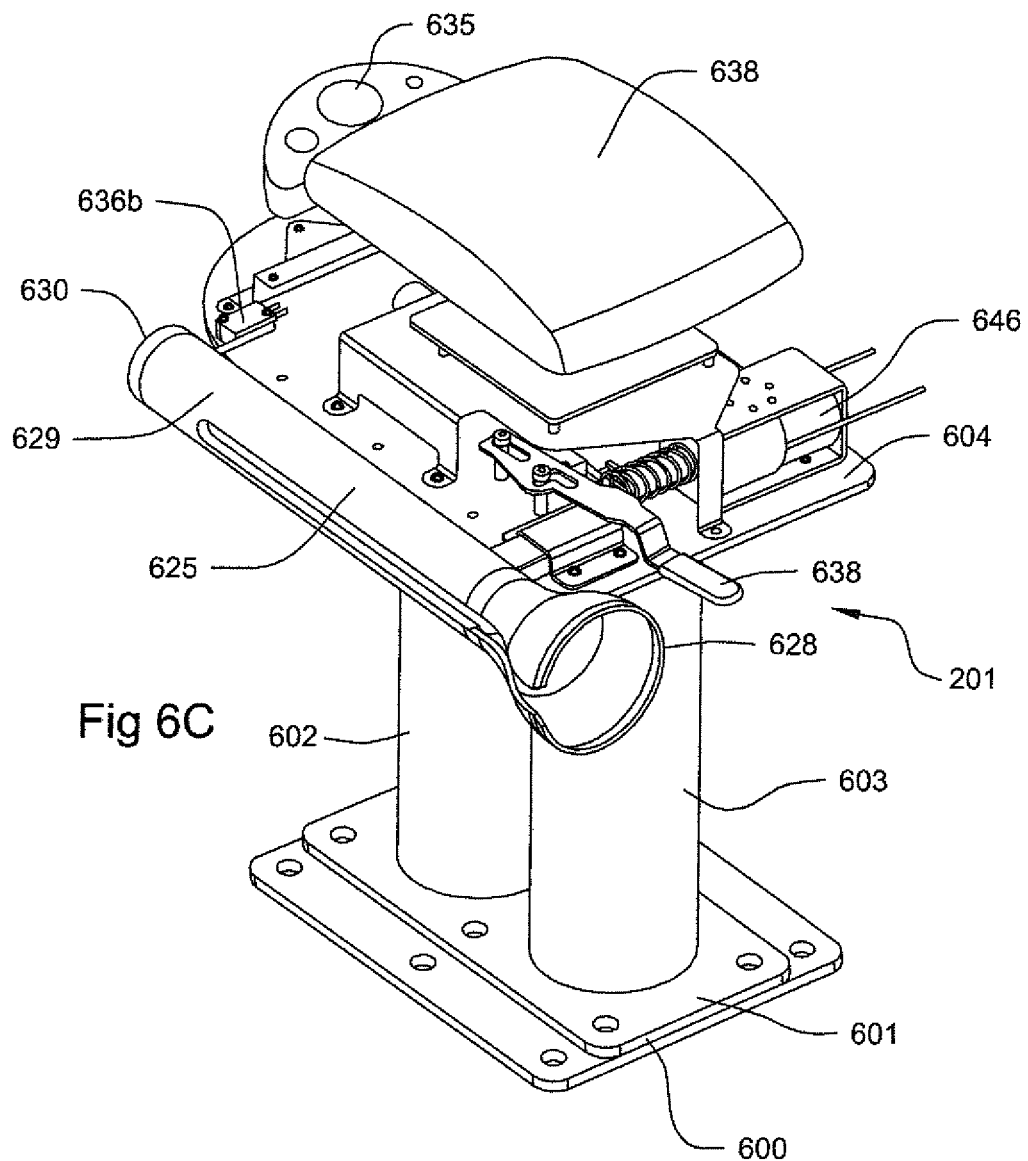
FIG. 6C illustrates is a perspective view the embodiment of the docking assembly shown in FIG. 6A.
Figure 6D:
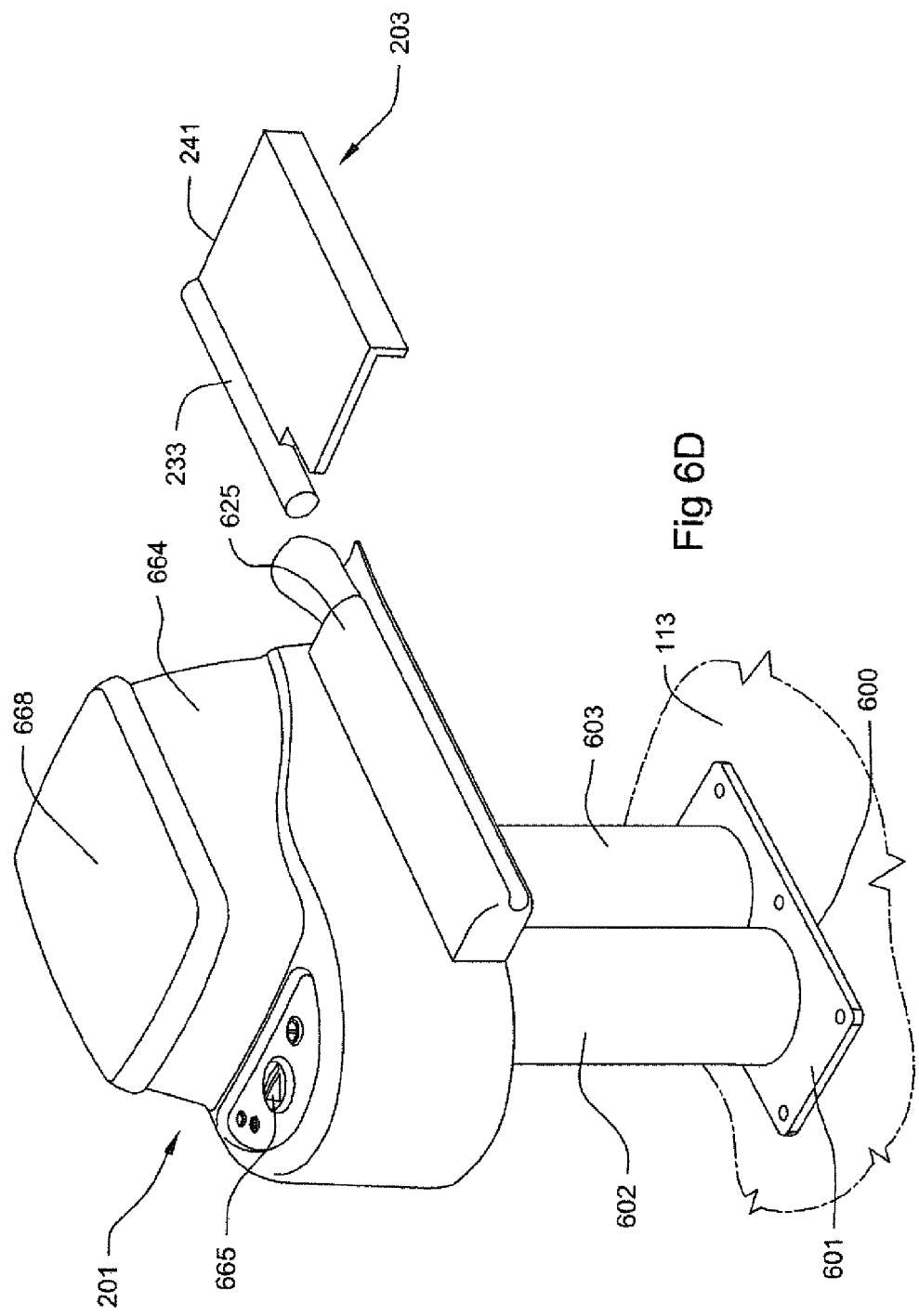
FIGS. 6D-6H illustrate three-dimensional depictions of a docking assembly in combination with various auxiliary elements.
Figure 6E:
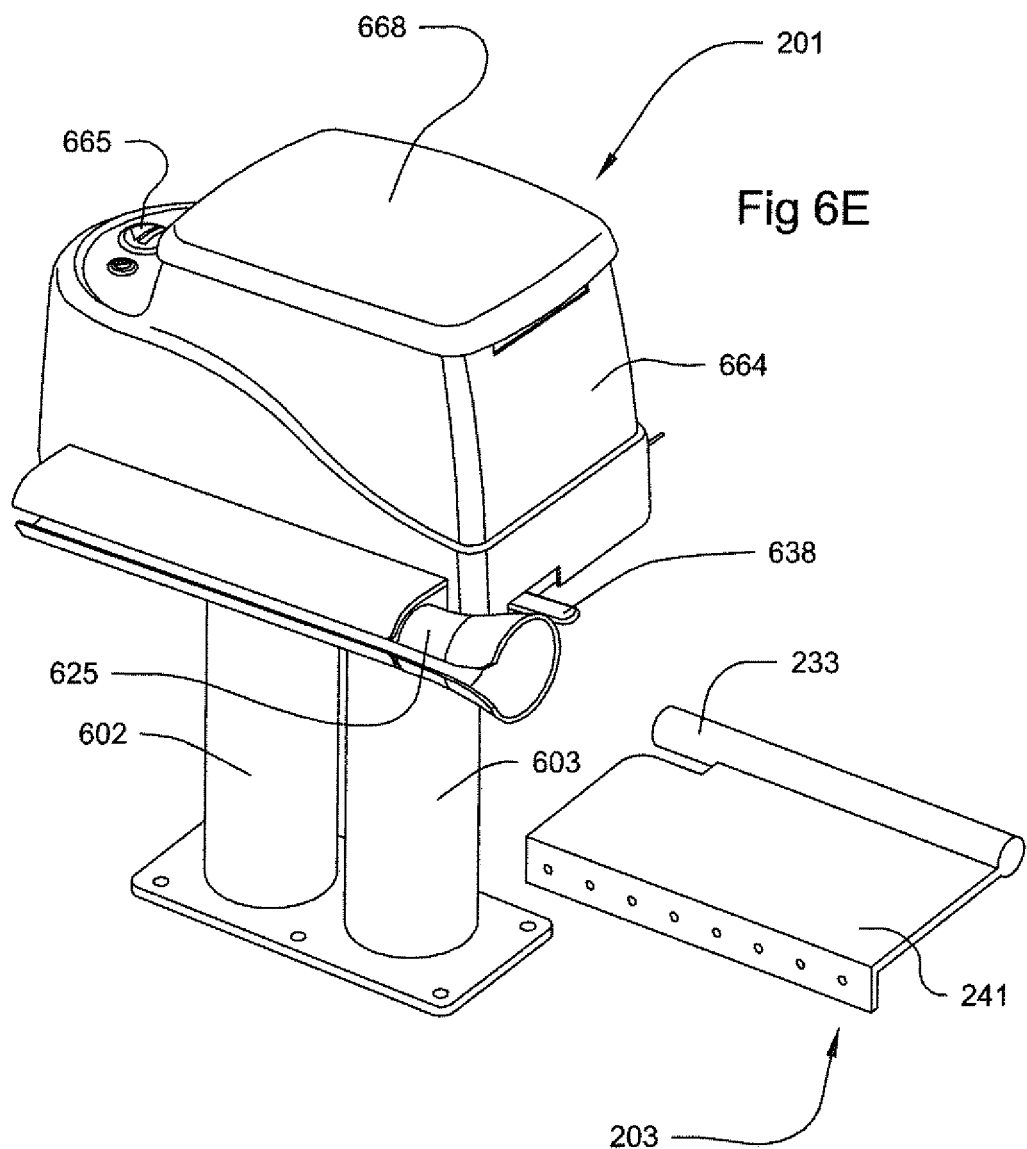

As shown in FIGS. 6A-6C, the locking assembly 202 may also include disengagement means 638, such as a lever, for manually disengaging locking pin assembly 635 so that the wheelchair 100 is released from the docking assembly. In a preferred embodiment, a release lever 638 is configured to disengage the locking pin 637 from the passageway 634 to release the wheelchair 100 from the locking assembly 202. The release lever 638 is positioned substantially parallel to the receiving member 625 and affixed to the top plate 604 at one end section 627 of the top plate 604. The release lever 638 may disengage the locking pin 637 in one step, but it is preferred that the release lever 638 disengage the locking pin 637 in a two step process to prevent accidentally disengagement of the wheelchair 100 from the locking assembly 202. In a preferred embodiment, the release lever 638 may be provided with a first slot 639 and a second slot 640. The first slot 639 is a substantially linear slot configured to allow the release lever 638 to move along an axis parallel to the receiving member 625 when the release lever 638 is subjected to a linear force. The second slot 640 is configured to allow the release lever 638 to move along an axis parallel to the receiving member 625 when the release lever 638 is subjected to a linear force and to move along an axis perpendicular to the receiving member 625 when the release lever 638 is subjected to a horizontal force. The second slot 640 is preferably an "L" shaped slot.

Figure 6F:
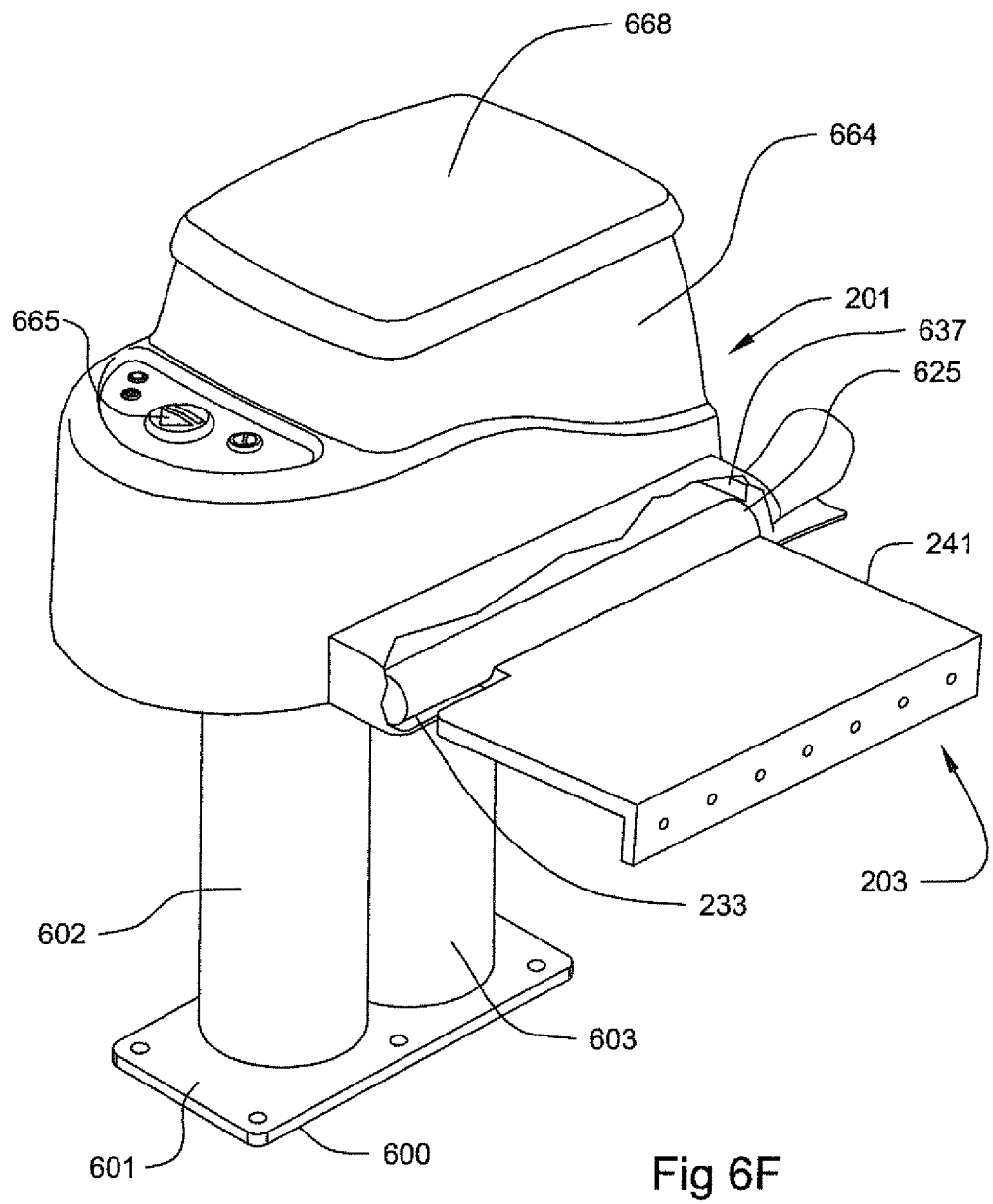

Referring now to FIG. 6B, in a preferred embodiment, the locking pin 637 may be extended and retracted manually. A first micro switch 636a is operatively connected to the locking assembly 202 to detect when the locking pin 637 extends to or retracts from the receiving member passageway 634. The end of the locking pin 637 is configured so that it retracts when the alignment rod 233 enters the receiving member passageway 634. In a preferred embodiment, the end of the locking pin 637 is angled, preferably angled to a tapered point, so that when the alignment rod 233 contacts the end of the locking pin 637, the alignment rod pushes the locking pin 637 out of the receiving member passageway 634 thereby retracing the locking pin 637. The alignment rod 233 moves through the receiving member passageway 634 until it is in the fully engaged position. When the alignment rod 233 is in the fully engaged position, the locking pin 637 extends into the window or opening provided on the receiving member passageway 634. In a preferred embodiment as shown in FIG. 6F, the locking pin 637 may extend into the receiving member passageway 634 behind the end of the alignment rod 233 near the receiving end section 628 to secure the alignment rod 233 in position. In an alternate embodiment, the alignment rod 233 may be provided with at least one opening configured to engage the locking pin thereby securing the alignment rod 233, i.e. when the opening on the alignment rod 233 is aligned with the opening on the receiving member 625, the locking pin 637 extends through both openings to secure the mobility device.

A second micro switch 636b is positioned to detect when alignment rod 233 is in the fully engaged position. The second micro switch 636b should be located near the stop end section 630 of the main body 629. In a preferred embodiment, both micro switches 636a, 636b are affixed to the top plate 604. To manually disengage the locking pin 637, the release lever 638 is pulled outward from the locking assembly 202, and then moved perpendicularly away from the receiving member 625. As the release lever 638 is moved away from the receiving member 625, the release lever 638 manually disengages the locking pin 637 and retracts the locking pin 637 from the receiving member passageway 634.

In an alternate embodiment, the locking pin may be extended or retracted with the aid of a solenoid 646. Upon detecting the alignment rod 233 entering the tubular member passageway 634, the first micro switch 636a signals solenoid 646 to engage its locking pin 637 and lift it out of passageway 634. Upon detecting alignment rod 233 in the fully engaged position, second micro switch 636a signals the solenoid 646 to magnetically disengage its locking pin 637 to permit the solenoid spring member to drive its locking pin 637 into the corresponding alignment rod opening 247. The locking assembly 202 may be in communication with a control module that controls the locking assembly 202, particularly the extension and retraction of the locking pin 637.

A control module can be in communication with a control panel that allows an operator to engage or disengage the locking pin. The control panel may be any conventional means such as a push button control panel, a touch screen control panel, and so forth. In addition, the control module can be programmed with warning alarms. For example, if the micro switches 636a, 636b do not detect full engagement of the locking pin 637 or full insertion of the alignment rod 233 into the receiving member 625, the operator may be alerted by a visual alert, audio alert, or combination thereof.

Top plate 604, in addition to providing a support to receiving member 625, can also serve as a platform on which various auxiliary elements can be affixed. FIG. 6H illustrates still further design configurations employing auxiliary elements that can be attached to docking assembly 201. One such element is a shallow storage unit 662 that can be provided with a lid 663 pivotally attached to storage unit body 664. Other elements that may be attached to a docking assembly 201 in accordance with this invention. Without limitation these can include a control panel 665, a day glow bezel in combination with lid; a heating unit 666 in combination with cup holder 667 and storage unit 664; the cup holder 667 may be a dual cup holder in combination with storage unit 664 having a top surface 668 to serve as an arm rest; control panel 665 in combination with a storage unit 664 having its top section shaped to serve as a dual cup holder; and a multitude of various elements further including by way of example a trash can, music player, smart phone, and/or power adapter pack.

Padding, such as carpet, can be affixed about tubular support units 602 and 603 utilizing Velcro strips or other known fastening means to provide aesthetic appeal and protection should powered wheelchair 100 strike support units 602 or 603. In addition, in an alternate preferred embodiment the top plate 604 can be constructed of two separated plates to permit an extension of the overall width of top plate 604. In this embodiment, separated plate is provided with one or more, and preferably at least two slots and that are separated to align with corresponding series of openings to permit securing bolts (not shown) to fix the plates and together to form the desired width of top plate 604. Cables, such as power, communication, and/or instrument cables, may be inserted through lower opening of tubular support units 602 and/or 603, and then through upper opening to provide power to any auxiliary elements that may be mounted to top plate 604. A metal cover or other suitable strong material may be fixed around the tubular support units 602 and 603 to provide protection from being hit by wheel chair 100 as it is docking or undocking.

Figure 6G:
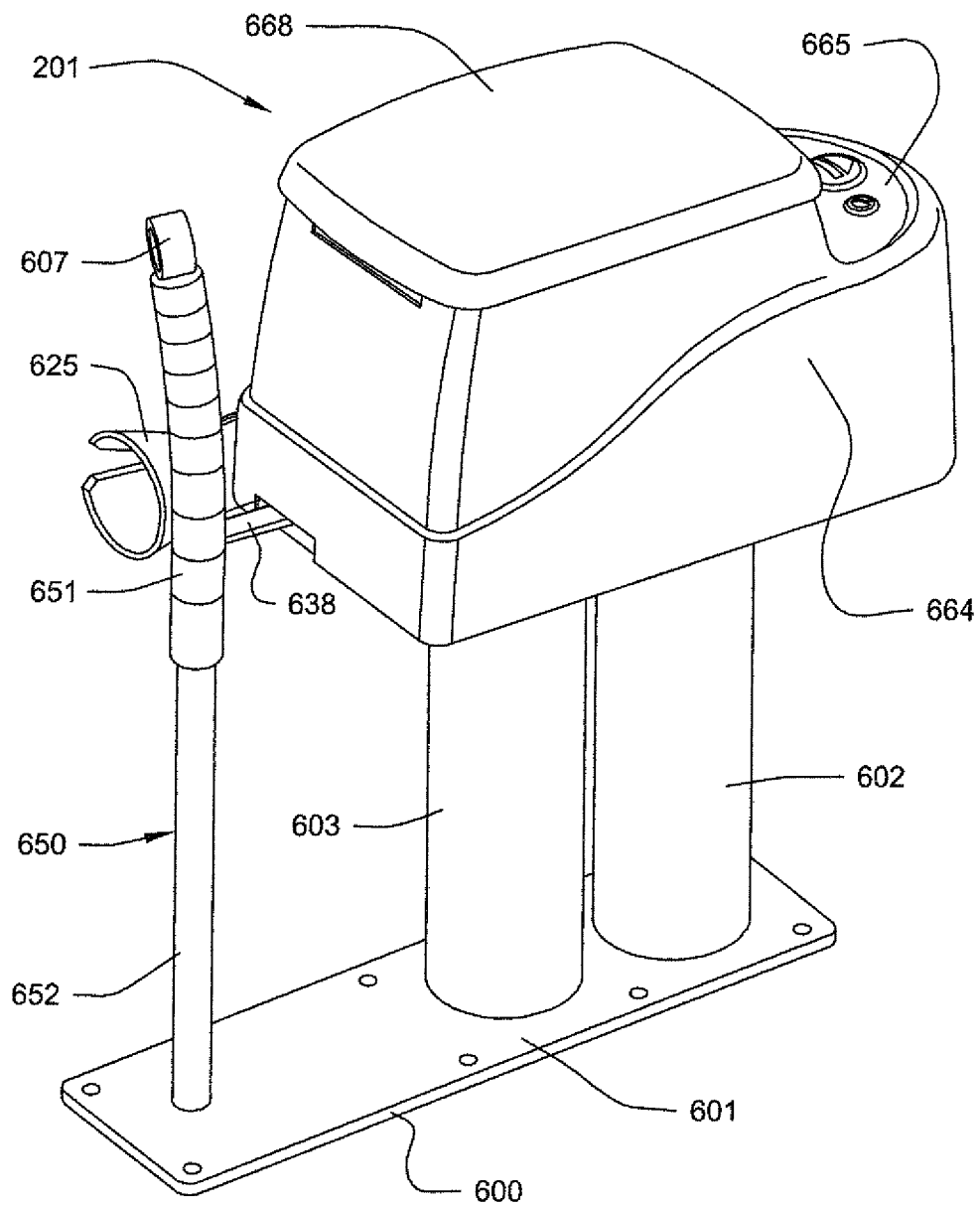
Figure 6H:
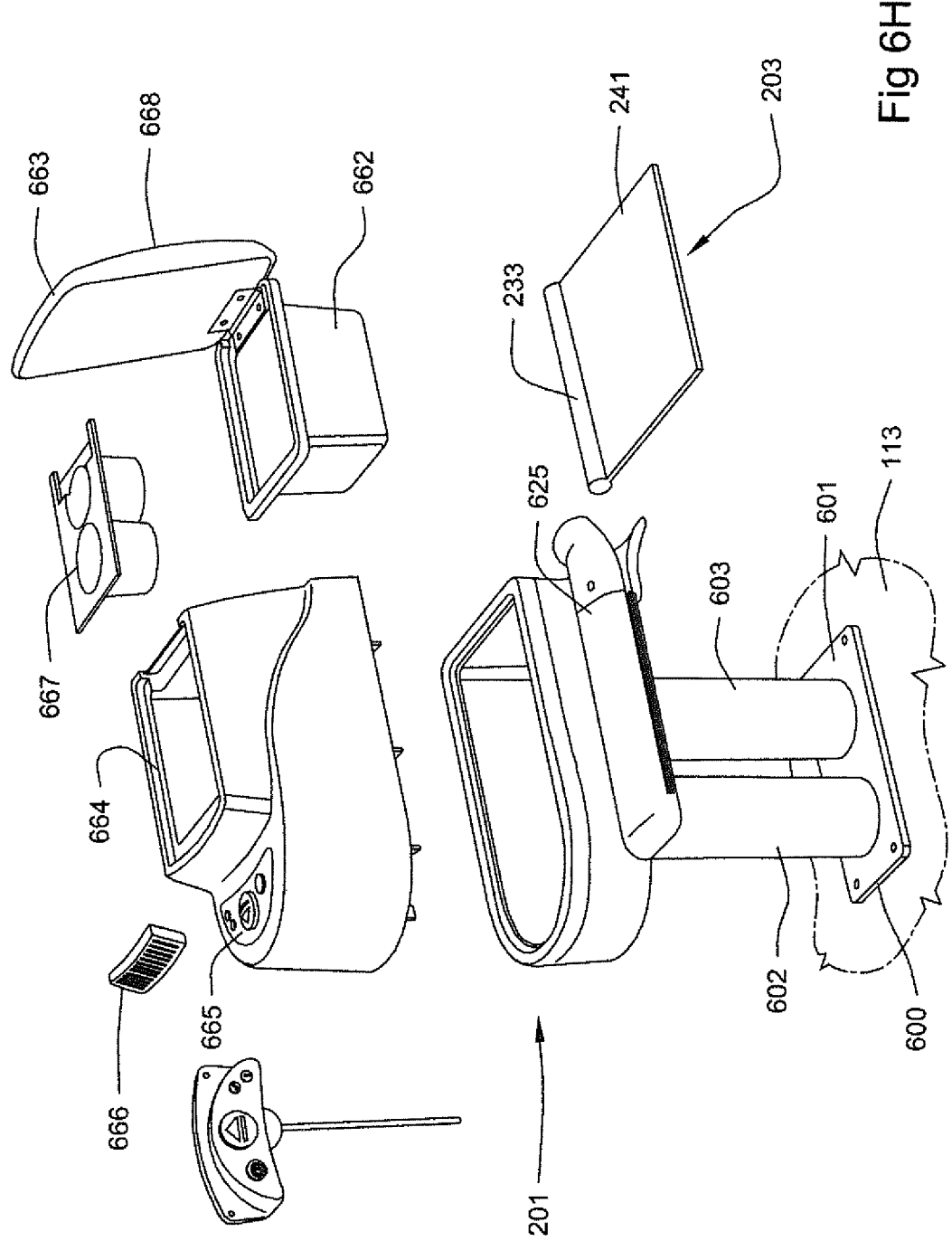

FIG. 6G illustrates yet another auxiliary element that can be affixed to top plate 604. More particularly a seat belt receptacle 607 may be directly affixed to base plate 601 or affixed to a tube 650 that is affixed to the base plate 601. The tube may include a flexible rubber or plastic section 651 and a metal section 652. The flexible rubber or plastic section 651 is preferably affixed to the seat belt receptacle 607 and the metal section 652. The metal section is preferably affixed to the base plate 601. The metal section 652 may be affixed to the base plate 601 by any conventional affixing means such as bolting, welding, and so forth. In an alternative embodiment, a seat belt receptacle 607 can be affixed to top plate 604. The location of the seat belt receptacle 607 is not limited by the aforementioned embodiments. The seat belt receptacle 607 and/or tube may be located anywhere on the docking assembly 201 that is easily accessible by a user.

In still another alternate embodiment, the embodiments depicted in FIGS. 6A-6H may also be configured to secure two wheelchairs by providing a second receiving member on the opposite side of the docking assembly as the first receiving member 625. The second receiving member can have its own locking assembly to secure the second wheelchair. In another embodiment, the locking assembly associated with the first receiving member may be adapted to function as the securing means for both the first and second receiving members.

FIGS. 7A-7C illustrates preferred embodiments of the receiving member 725 having a receiving end section 744 shaped to have a concentric reducer. It further illustrates providing the tubular receiving member 725 with slot 747 to permit the alignment of guide assembly rod 233 to enter into tubular passageway 750. It still further illustrates the use of gripping pads 799 to fit tubular receiving member 725 into a receiving tube 700 that is fixed to top plate 604. FIGS. 7D-7F illustrate an alternate preferred construction of receiving member 725 that permits receiving end section 744 to be detachable from main body section 745. In this embodiment, as shown in FIGS. 7D-7F, main body section 745 has a circular grove 705 into which snap fingers 706 formed on receiving end section 725 can fit and secure the receiving end section 744 to the main body section 745.

Figure 8B:
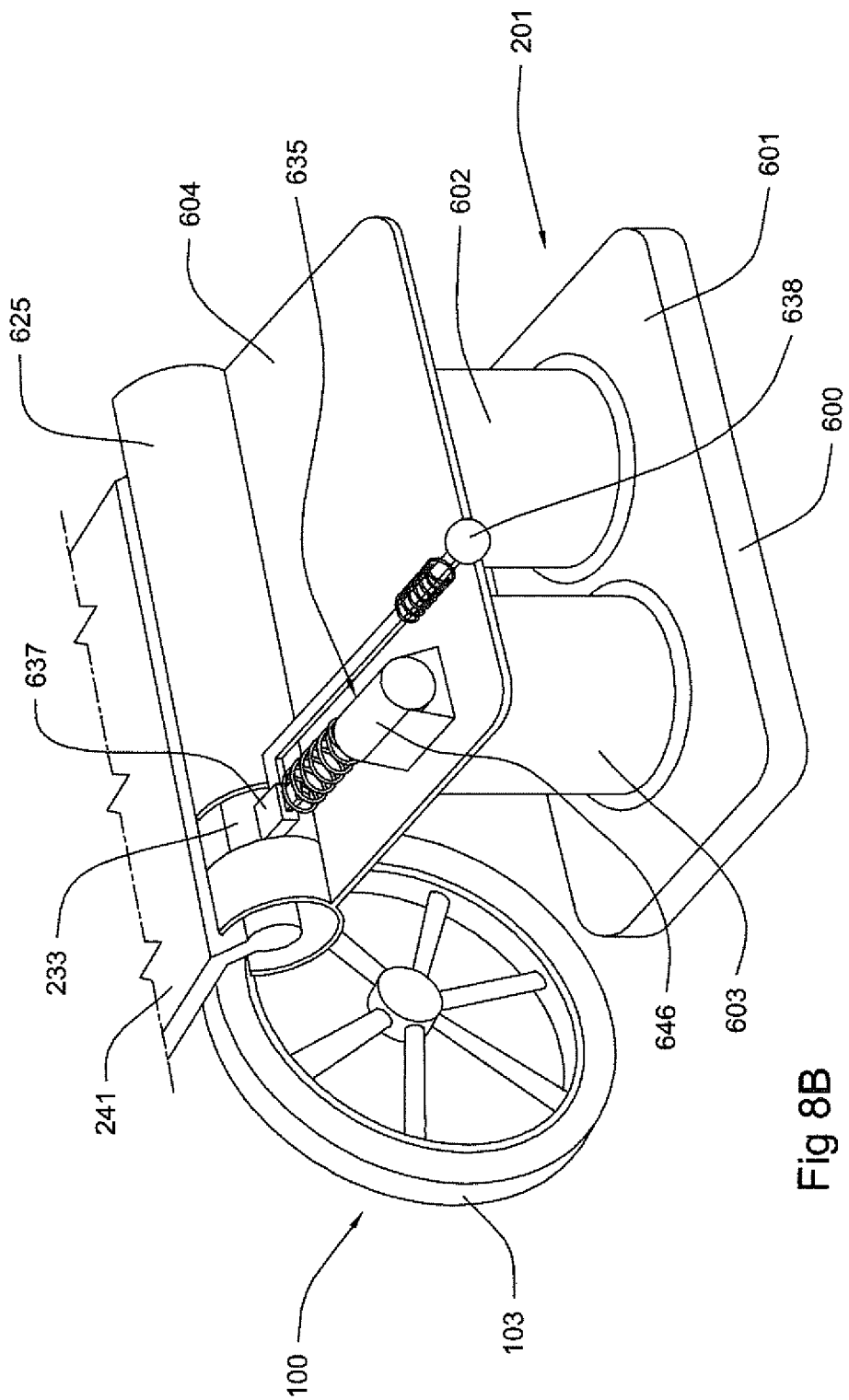

FIG. 8A illustrates wheel chair 100 being affixed to docking assembly 201. FIG. 8B illustrates an alternate embodiment of the locking pin assembly that can be used to secure alignment rod 233 in receiving member 625.

In another alternate embodiment, a device for securing a mobility device 900 may be used with a lifting device that is installed in or on a mobility vehicle or trailer. Referring to FIG. 9, the device for securing a mobility device 900 comprises a docking assembly 901, a locking assembly 902, and a guide assembly 903. The docking assembly 901 comprises a base plate 119, e.g. a platform for a mobility device, and at least one vertical support member. The docking assembly 901 may also include two or more vertical support members 908, 903 as shown in FIG. 9. The vertical support member may be vertically adjustable to move the base plate 119 vertically. The locking assembly 902 is affixed to the docking assembly 901. The locking assembly 902 may be configured in the same manner as the locking assemblies described above for the embodiments shown in 202. Likewise, the guide assembly 203 may be configured in the same manner as the described above. In an alternate embodiment (not shown), the receiving member 925 may be open at both ends of the main body 929 to allow the alignment rod 233 to engage the receiving member 925 from either side of the receiving member 925. Both ends of the receiving member 925 may be provided with enlarged receiving ends. As described above, the locking pin may be inserted or retracted into the receiving member 925 manually or automatically.

In operation, a mobility device, such as a wheelchair or scooter, with a guide assembly affixed to it is moved onto the base plate 119, such as a mobility device platform. As the mobility device 100 is moved onto the base plate 119, the alignment rod 233 is inserted into the receiving member 925. When the alignment rod 233 moves through the receiving member passageway it contacts the end of the locking pin so that it retracts when the alignment rod 233 enters the receiving member passageway. In a preferred embodiment, the end of the locking pin is angled, so that when the alignment rod 233 contacts the end of the locking pin the locking pin is retracted from the receiving member passageway. The alignment rod 233 moves through the receiving member passageway until it is in the fully engaged position. When the alignment rod 233 is in the fully engaged position, the locking pin extends into the window or receiving member passageway. In a preferred embodiment, the locking pin extends into the receiving member passageway behind the end of the alignment rod near the receiving end section 928 to secure the alignment rod 233. In an alternate embodiment, the alignment rod 233 may be provided with at least one opening configured to engage the locking pin thereby securing the alignment rod 233, i.e. when the opening on the alignment rod 233 is aligned with the opening on the receiving member 925, the locking pin extends through both openings to secure the mobility device. To disengage the locking pin, the release lever manually disengages the locking pin and retracts the locking pin from the receiving member passageway and the mobility device is disengaged.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A securing device for securing a mobility device to the floor of a vehicle, the vehicle having a front and the mobility device having a front, opposing sides and a chair frame with a seat positioned above a base structure on which a person can sit, the device comprising:
   a base member fixedly attachable to the vehicle floor;
   a guide assembly connectable with the frame of a mobility device and including an alignment rod with an axis;
   a locking assembly including a tubular receiving member and a locking pin assembly, the tubular receiving member having a length and first and second ends, being connected to said base member and defining a receiving passageway with an axis and a first opening to the receiving passageway at the first end; and
   wherein the locking pin assembly is connected with said base member and includes a locking pin having locking and unlocked positions, the locking position including the alignment rod extending coaxially into the receiving passageway and the locking pin extending into the receiving passageway to prevent said alignment rod from exiting the receiving passageway.

2. The securing device for securing a mobility device to the floor of a vehicle of claim 1 wherein the tubular receiving member defines a slot extending from the opening and along at least a portion of the length toward the second end.

3. The securing device for securing a mobility device to the floor of a vehicle of claim 2 wherein said guide assembly includes a support member connected to the alignment rod, the support member being configured for rigid connection to the mobility device with the alignment rod axis being parallel to and outside one side of the mobility device.

4. The securing device for securing a mobility device to the floor of a vehicle of claim 3 wherein the support member is a plate.

5. The securing device for securing a mobility device to the floor of a vehicle of claim 3 wherein the slot is sized and configured to receive a portion of the support member therein when the connected mobility device is moved alongside the tubular receiving member and the alignment rod moves into the passageway.

6. The securing device for securing a mobility device to the floor of a vehicle of claim 5 wherein the tubular receiving member defines a pin opening and the locking position includes the locking pin extending through the pin opening and into engagement with and behind at least a portion of the alignment rod to prevent the alignment rod from moving rearwardly out of the tubular receiving member.

7. The securing device for securing a mobility device to the floor of a vehicle of claim 5 wherein said locking assembly further includes a sensor configured to sense and transmit a signal upon sensing the presence of an object entering the receiving passageway, and the locking assembly is operatively connected to the sensor to receive the signal and positioned to drive the locking pin into the interior passageway to the locking position.

* * * * *